(12) United States Patent
Takano

(10) Patent No.: US 6,853,800 B2
(45) Date of Patent: *Feb. 8, 2005

(54) METHOD OF GENERATING INDEX IMAGE, APPARATUS FOR GENERATING INDEX IMAGE, METHOD OF CORRECTING INDEX IMAGE DATA, APPARATUS FOR CORRECTING INDEX IMAGE DATA, METHOD OF CORRECTING EDIT AUXILIARY DATA, AND APPARATUS FOR CORRECTING EDIT AUXILIARY DATA

(75) Inventor: Akira Takano, Kanagawa (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/125,102

(22) PCT Filed: Dec. 9, 1997

(86) PCT No.: PCT/JP97/04523

§ 371 (c)(1),
(2), (4) Date: Apr. 19, 1999

(87) PCT Pub. No.: WO98/26419

PCT Pub. Date: Jun. 18, 1998

(65) Prior Publication Data

US 2003/0123848 A1 Jul. 3, 2003

(30) Foreign Application Priority Data

Dec. 9, 1996 (JP) .............................................. 8-328946

(51) Int. Cl.[7] .............................................. H04N 5/93
(52) U.S. Cl. .............................. 386/52; 386/64; 386/69; 386/95
(58) Field of Search .............................. 386/55, 64, 69, 386/95, 52

(56) References Cited

U.S. PATENT DOCUMENTS

| | | | | |
|---|---|---|---|---|
| 4,774,600 A | * | 9/1988 | Baumeister | .................... 386/55 |
| 5,521,766 A | * | 5/1996 | Minoda et al. | .............. 386/104 |
| 5,581,362 A | * | 12/1996 | Sakaue et al. | ................ 386/95 |
| 5,703,994 A | * | 12/1997 | Lee et al. | ...................... 386/52 |
| 6,038,368 A | * | 3/2000 | Boetje et al. | ................. 386/52 |
| 6,327,109 B1 | * | 12/2001 | Kori et al. | .................... 386/121 |
| 6,487,362 B1 | * | 11/2002 | Yuen et al. | .................... 386/83 |

FOREIGN PATENT DOCUMENTS

| | | |
|---|---|---|
| JP | 61-66278 | 4/1986 |
| JP | 2-214082 | 8/1990 |
| JP | 4-117686 | 4/1992 |
| JP | 6-44744 | 2/1994 |
| JP | 6-153130 | 5/1994 |
| JP | 6-343148 | 12/1994 |

\* cited by examiner

Primary Examiner—Vincent Boccio
Assistant Examiner—James A. Fletcher
(74) Attorney, Agent, or Firm—Frommer Lawrence & Haug LLP; William S. Frommer; Darren M. Simon

(57) ABSTRACT

It becomes possible to generate an index information used as an auxiliary upon edition on a recording medium where video information is recorded to record it on a recording medium, and to select a picture matched with a desired condition from the video information recorded on the recording medium to generate the index picture information.

The controller 35 reads a time code of a mark-in point from a cassette attached memory 16, reproduces the picture of the mark-in point matched with the desired condition as an index picture and supplies the reproduced signal from a video signal compression coding/decoding unit 40 to an index generating unit 40. The index generating unit 40 compresses and reduces the index picture and arranges a plurality of pictures in one frame, thereby generating an index picture information. The index generating unit 40 outputs the index pictures to record them on the video tape 27.

9 Claims, 33 Drawing Sheets

FIG. 9

| ADDRESS | MSB | BANK0 | | LSB | | |
|---|---|---|---|---|---|---|
| | 0 | APM | BCID | | | |
| | 1 | 0 0 0 0 0 0 0 0 | | | | PC0 |
| | 2 | ME 1 1 | MULTI-BYTES | MEM TYPE | | PC1 |
| CASSETTE ID PACK | 3 | MEM SIZE of SPACE 0 | MEM SIZE of the LAST BANK in SPACE 1 | | | PC2 |
| | 4 | MEM BANK NO. of SPACE 1 | | | | PC3 |
| | 5 | UNITS of TAPE THICKNESS | 1/10 of TAPE THICKNESS | | | PC4 |
| | 6 | 0 0 0 0 0 0 0 1 | | | | PC0 |
| | 7 | LSB 1 | | | | PC1 |
| | 8 | TAPE LENGTH | | | | PC2 |
| TAPE LENGTH PACK | 9 | MSB (binary) | | | | PC3 |
| | 10 | 1 1 1 1 1 1 1 1 | | | | PC4 |
| | 11 | 0 0 0 1 1 1 1 0 | | | | PC0 |
| | 12 | LSB BF | | | | PC1 |
| TITLE END PACK | 13 | TAPE LENGTH | | | | PC2 |
| | 14 | MSB (binary) | | | | PC3 |
| | 15 | SR RE 1 1 1 1 1 1 | | | | PC4 |
| | | IP11 | | | | |
| | | IP12 | | | | |
| | | ... | | | | |
| | | IPadd1 | | | | |
| | | IPadd2 | | | | |
| 2048 | | | | | | |

53 MAIN AREA

54 OPTION AREA

FIG. 10

| FB | | | 51 |
|---|---|---|---|
| MARK-OUT POINT RELATIVE VALUE | | | 52 |
| SCENE NUMBER | | | |
| b0 | OK | TAKE NUMBER | |
| b1 | b2 | | |

FIG. 11

| FB | | | 51 |
|---|---|---|---|
| | | MARK-OUT POINT RELATIVE VALUE | 52 |
| | | SECOND | |
| b0 | | MINUTE | |
| b1 | b2 | HOUR | |

FIG. 12

| FB | | | 51 |
|---|---|---|---|
| | | FRAME | 52 |
| | | SECOND | |
| b0 | | MINUTE | |
| b1 | b2 | HOUR | |

FIG. 13

| FB | | | 51 |
|---|---|---|---|
| | | FRAME | 52 |
| | | SECOND | |
| b0 | | MINUTE | |
| b1 | b2 | HOUR | |

| | MSB | | | | | | | LSB |
|---|---|---|---|---|---|---|---|---|
| PC0 | 1 | 1 | 1 | 1 | 1 | 0 | 1 | 1 |
| PC1 | ←·········· MARK-OUT POINT ··········→ RELATIVE VALUE TO PC1 OF IPN2 ||||||||
| PC2 | SCENE NUMBER ········································· LSB ||||||||
| PC3 | 0 | OK/NG | TAKE NUMBER ||||| MSB |
| PC4 | 1 | 0 | 1 | 1 | 1 | 1 | 1 | 1 |

| | MSB | | | | LSB |
|---|---|---|---|---|---|
| PC0 | 1 | 1 1 1 1 0 1 1 |||||
| PC1 | ←······ MARK-OUT POINT ······ RELATIVE VALUE TO PC1 OF IPN1 LSB |||||
| PC2 | | TENS of SECONDS || UNITS of SECONDS ||
| PC3 | 1 | TENS of MINUTES || UNITS of MINUTES ||
| PC4 | 1 | 0 | TENS of HOURS | UNITS of HOURS ||

FIG. 17

|   | MSB | | | | | | | LSB |
|---|---|---|---|---|---|---|---|---|
| PC0 | 1 | 1 | 1 | 1 | 1 | 0 | 1 | 1 |
| PC1 | 1 | 1 | TENS of FRAMES | | | UNITS of FRAMES | | |
| PC2 | 1 | TENS of SECONDS | | | UNITS of SECONDS | | | |
| PC3 | 0 | TENS of MINUTES | | | UNITS of MINUTES | | | |
| PC4 | 0 | 1 | TENS of HOURS | | UNITS of HOURS | | | |

FIG. 18

|   | MSB | | | | | | | LSB |
|---|---|---|---|---|---|---|---|---|
| PC0 | 1 | 1 | 1 | 1 | 1 | 0 | 1 | 1 |
| PC1 | | 1 | TENS of FRAMES | | | UNITS of FRAMES | | |
| PC2 | | TENS of SECONDS | | | UNITS of SECONDS | | | |
| PC3 | 0 | TENS of MINUTES | | | UNITS of MINUTES | | | |
| PC4 | 0 | 1 | TENS of HOURS | | UNITS of HOURS | | | |

FIG. 19

|   | MSB | | | | | | | LSB |
|---|---|---|---|---|---|---|---|---|
| PC0 | 1 | 1 | 1 | 1 | 1 | 0 | 1 | 1 |
| PC1 | | | | | | | | LSB |
| PC2 | ABSOLUTE TRACK NUMBER | | | | | | | |
| PC3 | 1 | MSB | | | | | | |
| PC4 | 0 | 0 | FORMAT | | 1 | 1 | 1 | 1P |

FIG. 25

| FR | | | SB NO. | SUB CODE DATA |
|---|---|---|---|---|
| 1 | AP3 | ABSOLUTE TRACK NO. | 0 | FB (1Padd1) |
| 1 | TAG | | 1 | FB (1Padd2) |
| 1 | TAG | | 2 | FB (CUE) |
| 1 | TAG | ABSOLUTE TRACK NO. | 3 | TTC |
| 1 | TAG | | 4 | TTC or BIN or NO INFO |
| 1 | TAG | | 5 | TTC |
| 1 | AP3 | ABSOLUTE TRACK NO. | 6 | FB (IPn1) |
| 1 | TAG | | 7 | FB (IPn2) |
| 1 | TAG | | 8 | |
| 1 | TAG | ABSOLUTE TRACK NO. | 9 | TTC |
| 1 | TAG | | 10 | TTC or BIN or NO INFO |
| 1 | APT | | 11 | TTC |

Columns: MSB — ID0 — LSB MSB — ID1 — LSB — DATA

FIG. 26

| FR | ID0 | | SB NO. | SUB CODE DATA |
|---|---|---|---|---|
| 0 | AP3 | ABSOLUTE TRACK NO. | 0 | FO (PM) |
| 0 | TAG | | 1 | FB (R1) |
| 0 | TAG | | 2 | FB (R2) |
| 0 | TAG | ABSOLUTE TRACK NO. | 3 | TTC |
| 0 | TAG | | 4 | REC DATE or NO INFO |
| 0 | TAG | | 5 | REC TIME or NO INFO |
| 0 | AP3 | ABSOLUTE TRACK NO. | 6 | RESERVE |
| 0 | TAG | | 7 | RESERVE |
| 0 | TAG | | 8 | RESERVE |
| 0 | TAG | ABSOLUTE TRACK NO. | 9 | TTC |
| 0 | TAG | | 10 | REC DATE or NO INFO |
| 0 | APT | | 11 | REC TIME or NO INFO |

| MAIN AREA |
|---|
| IP11(MARK-IN1) |
| IP12(MARK-IN1) |
| IP21(MARK-IN2) |
| IP22(MARK-IN2) |
| ⋮ |
| IPadd1 |
| IPadd2 |

| MAIN AREA |
|---|
| IP11(MARK-IN1N) |
| IP12(MARK-IN1N) |
| IP21(MARK-IN2) |
| IP22(MARK-IN2) |
| ⋮ |
| IPadd1 |
| IPadd2 |

| MAIN AREA |
|---|
| $IP_{11}$(MARK-IN1) |
| $IP_{12}$(MARK-IN1) |
| $IP_{21}$(MARK-IN2) |
| $IP_{21}$(MARK-IN2) |
| ⋮ |
| IPadd1 |
| IPadd2 |
|  |
|  |

| MAIN AREA |
|---|
| $IP_{11}$(MARK-IN1) |
| $IP_{12}$(MARK-IN1) |
| $IP_{21}$(MARK-IN3) |
| $IP_{22}$(MARK-IN3) |
| $IP_{31}$(MARK-IN2) |
| $IP_{32}$(MARK-IN2) |
| ⋮ |
| IPadd1 |
| IPadd2 |
|  |
|  |

| MAIN AREA |
|---|
| $IP_{11}$(MARK-IN1) |
| $IP_{12}$(MARK-IN1) |
| $IP_{21}$(MARK-IN2) |
| $IP_{21}$(MARK-IN2) |
| ⋮ |
| $IPadd1$(VALID) |
| $IPadd2$(VALID) |
| |
| |

| MAIN AREA |
|---|
| $IP_{11}$(MARK-IN1) |
| $IP_{12}$(MARK-IN1) |
| $IP_{21}$(MARK-IN3) |
| $IP_{22}$(MARK-IN3) |
| $IP_{31}$(MARK-IN2) |
| $IP_{32}$(MARK-IN2) |
| ⋮ |
| $IPadd1$(VOID) |
| $IPadd2$(VOID) |
| $IPadd1N$(VOID) |
| $IPadd2N$(VOID) |

| MAIN AREA |
|---|
| IP11(MARK-IN1) |
| IP12(MARK-IN1) |
| IP21(MARK-IN2) |
| IP21(MARK-IN2) |
| ⋮ |
| IPadd1 |
| IPadd2 |
| |
| |

| MAIN AREA |
|---|
| IP11(MARK-IN1) |
| IP12(MARK-IN1) |
| IP21(MARK-IN3) |
| IP22(MARK-IN3) |
| IP31(MARK-IN2) |
| IP32(MARK-IN2) |
| ⋮ |
| IPadd1N |
| IPadd2N |
| |
| |

METHOD OF GENERATING INDEX IMAGE, APPARATUS FOR GENERATING INDEX IMAGE, METHOD OF CORRECTING INDEX IMAGE DATA, APPARATUS FOR CORRECTING INDEX IMAGE DATA, METHOD OF CORRECTING EDIT AUXILIARY DATA, AND APPARATUS FOR CORRECTING EDIT AUXILIARY DATA

TECHNICAL FIELD

The present invention relates to an index picture generating method of generating an index picture information which is useful when picture informations recorded on a recording medium such as a video tape or the like are edited, an index picture generating apparatus therefor, an index picture information modifying method, an index picture information modifying apparatus, an edition auxiliary information modifying method and an edition auxiliary information modifying apparatus.

BACKGROUND ART

Previously, there has been an off-line editing as one method for editing picture information recorded in a recording medium of a video tape or the like. The off-line editing is such a method that the picture information recorded in an original tape at the site of the picture taking is once copied in another recording tape, that is, an editing tape, and on this editing tape, the editing data such as an editing point are prepared, and on the basis of this editing data, a master tape is prepared. In this off-line editing, a desired master tape can be prepared without accidentally eliminating or rewriting the important recording information on the original tape.

However, in the off-line editing, since the editing work is performed by using an editing tape copied from an original tape, there is such a problem that when copying the information on an original tape to an editing tape, time and labor are taken. Furthermore, when preparing editing data by using an editing tape, for ensuring an approach running term in advance, the pre-roll is inevitable, and further, since the access to the object editing point takes time, there is such a problem that preparation of editing data inevitably takes considerable time.

Therefore, as one method to solve said problems, there is such a method that the information on an original tape is once copied in a disk-like recording medium such as a hard disk in which recording is possible and random access is possible, and by using the copied information on the disk-like recording medium, the editing data are prepared. By this method, since the access to the editing point can be performed in a short time, it is possible to decrease the time required for the editing work.

When a small picture is produced from a head of each scene upon shooting an image, even if there ia a target image in the middle of the scene, it is impossible to set the image in the small screen and further a small screen which is not necessary may be produced, which increases the number of small screens unnecessarily. Therefore, it may become impossible to carry out an editing work efficiently.

DISCLOSURE OF THE INVENTION

In view of such aspects, it is an object of the present invention to provide index picture generating method and apparatus which make it possible to generate an index picture information used as an auxiliary upon edition to record it on a recording medium and to make it possible to select a picture matched with a desired condition from video information recorded on the recording medium to generate an index picture information.

It is another object of the present invention to provide edition auxiliary information modifying method and apparatus which make it possible to modify an edition auxiliary information used for generating an index picture information for easily displaying an index picture serving as an index upon edition of video information, used for edition, and recorded on at least one of a recording medium where the video information is recorded and a memory accompanying the recording medium.

It is further another object of the present invention to provide index picture generating method and apparatus which can generate an index picture information used as an auxiliary upon edition by using a recording medium where video information is recorded in correspondence with an optional point serving as an index upon edition on a recording medium, and which can record the information on the recording medium.

An index picture generating method according to the present invention includes a step of recording an index information for specifying a point or an area which is located on a recording medium and serves as an index upon edition and an additional information concerning attributes of a video information at the point or area specified by the index information on at least one of a recording medium used to record a video information and a memory accompanying the recording medium upon at least one of the recording and reproduction of the video information, and a step of, based on at least the index information of the index information and the additional information recorded on at least one of the recording medium and the memory, selecting an index picture used for edition from video information on the recording medium and generating an index picture information used for easily displaying the index picture to record the index picture information on the recording medium.

An index picture generating apparatus according to the present invention includes an index picture information generating means for, based on at least an index information of the index information for specifying a point or an area located on a recording medium serving as an index upon edition and an additional information concerning attributes of a video information at the point or area specified by the index information which are recorded, selecting an index picture used for edition from video information on the recording medium to generate an index picture information used for easily displaying the index picture, and an index picture information recording means for recording the index picture information generated by the index picture information recording means on the recording medium.

According to the index picture generating method or the index picture generating apparatus according to the present invention, the index picture is selected based on the index information of the index information and the additional information recorded on at least one of the recording medium and the memory, an index picture information used for easily displaying the index picture is generated, and the index picture information is recorded on the recording medium. Therefore, even if the index picture information is not generated upon the shooting, then it is possible to generate the index picture information based on at least the index information of the index information and the additional information recorded on at least one of the recording medium and the memory.

An index picture generating method according to the present invention includes a step of recording an index information for specifying a point which is located on a recording medium and serves as an index upon edition on at least one of a recording medium used to record a video information and a memory accompanying the recording medium, and a step of, based on at least the index information recorded on at least one of the recording medium and the memory, selecting an index picture used for edition from video information on the recording medium and generating an index picture information used for easily displaying the index picture to record the index picture information on the recording medium.

An index picture generating apparatus according to the present invention includes an index picture information recording means for, by using a recording medium where an index information for specifying an optional point which is located on a recording medium and serves as an index upon edition on at least one of a recording medium where a video information is recorded and a memory accompanying the recording medium, based on at least the index information recorded on at least one of the recording medium and the memory, selecting an index picture used for edition from video information on the recording medium and generating an index picture information used for easily displaying the index picture to record it on the recording medium.

According to the index picture generating method or the index picture generating apparatus according to the present invention, the index picture is selected based on the index information recorded on at least one of the recording medium and the memory, an index picture information used for easily displaying the index picture is generated, and the index picture information is recorded on the recording medium. Therefore, even if the index picture information is not generated upon the shooting, then it is possible to generate the index picture information based on at least the index information of the index information and the additional information recorded on at least one of the recording medium and the memory.

An index picture information modifying method according to the present invention includes an index picture information modifying step of modifying an index picture information which is used for easily displaying an index picture used for edition of video information and which is recorded on a recording medium where the video information is recorded, and an index picture storing step of recording the modified index picture information on the recording medium.

An index picture information modifying apparatus according to the present invention includes an index picture information modifying means for modifying an index picture information which is used for easily displaying an index picture used for edition of video information and which is recorded on a recording medium where the video information is recorded, and an index picture storing means for recording the index picture information modified by the index picture information modifying means on the recording medium.

According to the index picture information modifying method or the index picture information modifying apparatus of the present invention, the index picture information recorded on the recording medium where the video information is recorded is modified, and the modified index picture information is recorded on the recording medium.

An edition auxiliary information modifying method according to the present invention a step of modifying an edition auxiliary information used for generating an index picture information used for easily displaying an index picture serving as an index for edition of the video information, used for edition and recorded on at least one of a recording medium where the video information is recorded and a memory accompanying the recording medium, and a step of recording the modified edition auxiliary information on at least one of the recording medium and the memory.

An edition auxiliary information modifying method according to the present invention includes an edition auxiliary information modifying means for modifying an edition auxiliary information used for generating an index picture information used for easily displaying an index picture serving as an index for edition of the video information, used for edition and recorded on at least one of a recording medium where the video information is recorded and a memory accompanying the recording medium, and an edition auxiliary information recording means for recording the edition auxiliary information modified by the edition auxiliary information modifying means on at least one of the recording medium and the memory.

According to the edition auxiliary information modifying method or the edition auxiliary information modifying apparatus of the present invention, the edition auxiliary information recorded on the recording medium where the video information is recorded is modified, and the modified edition auxiliary information is recorded on the recording medium.

BRIEF DESCRIPTION OF DRAWINGS

FIG. 9 is an explanatory diagram showing a data format of the cassette attached memory;

FIGS. 10, 11, 12, 13 and 14 are explanatory diagrams schematically showing contents of a pack concerning an index picture used in the method and apparatus according to the embodiment of the present invention;

FIG. 15 is an explanatory diagram showing the detailed content of the pack shown in FIG. 10;

FIG. 16 is an explanatory diagram showing the detailed content of the pack shown in FIG. 11;

FIG. 17 is an explanatory diagram showing the detailed content of the pack shown in FIG. 12;

FIG. 18 is an explanatory diagram showing the detailed content of the pack shown in FIG. 14;

FIG. 19 is an explanatory diagram showing the detailed content of the pack shown in FIG. 14;

FIGS. 25 and 26 are diagrams used to explain a format of the subcode portion on the video tape;

FIG. 39 is a diagram used to explain change of data in the cassette attached memory upon the change of the mark-in point shown in FIG. 38;

FIG. 43 is a diagram used to explain change of data in the cassette attached memory upon the addition of the mark-in point and the mark-out point shown in FIG. 42;

FIG. 47 is a diagram used to explain a method of modifying data in the cassette attached memory in the case shown in FIG. 46;

FIG. 49 is a diagram used to explain modification of the data in the cassette attached memory in an example shown in FIG. 48;

BEST MODE FOR CARRYING OUT THE INVENTION

Figure 1:
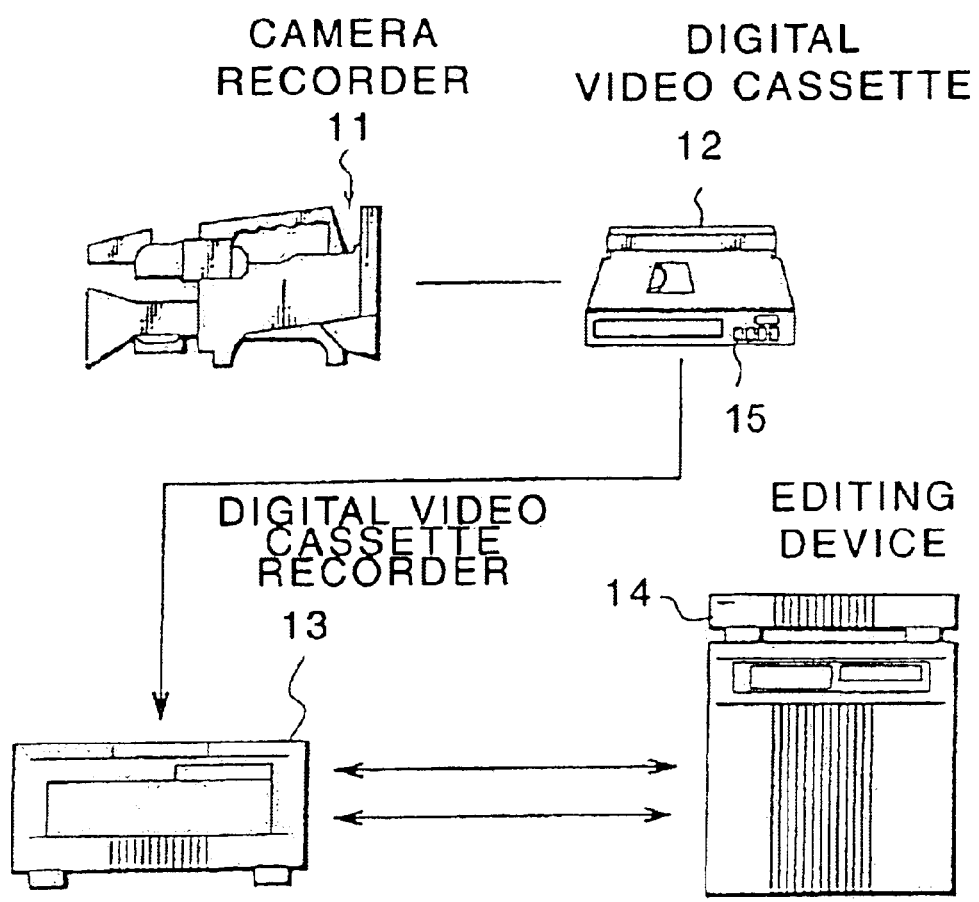
FIG. 1 is a diagram used to explain an arrangement of the whole system to which method and apparatus according to one embodiment of the present invention is applied.

An embodiment of the present invention will be described below in detail with reference to the accompanying drawings.

Initially, the arrangement of the whole system to which index picture generating method and apparatus according to this embodiment are applied, will be described with reference to FIG. 1. This system includes a camera/recorder 11 having a digital video camera unit and a digital VTR unit which records a picture signal obtained by taking a picture at this digital video camera unit, into a digital video cassette 12 as a digital signal, a digital video cassette recorder 13 which performs reproduction and the like of a picture signal recorded in the digital video cassette 12, and an editing device 14 which performs non linear editing by using the information from the digital video cassette recorder 13. The digital video camera unit and the digital VTR unit in the camera/recorder 11 may be integrated, or may be separable. The digital video cassette 12 uses a video tape of, for example, 6.3 mm (¼ inch), and includes a memory attached to a cassette using a semiconductor memory in the cassette, and has a terminal 15 for connecting the memory attached to a cassette and an outside circuit, for example, at the back portion of the cassette. The digital video cassette recorder 13 shown in FIG. 1 corresponds to the index picture generating apparatus according to this embodiment.

Figure 2:
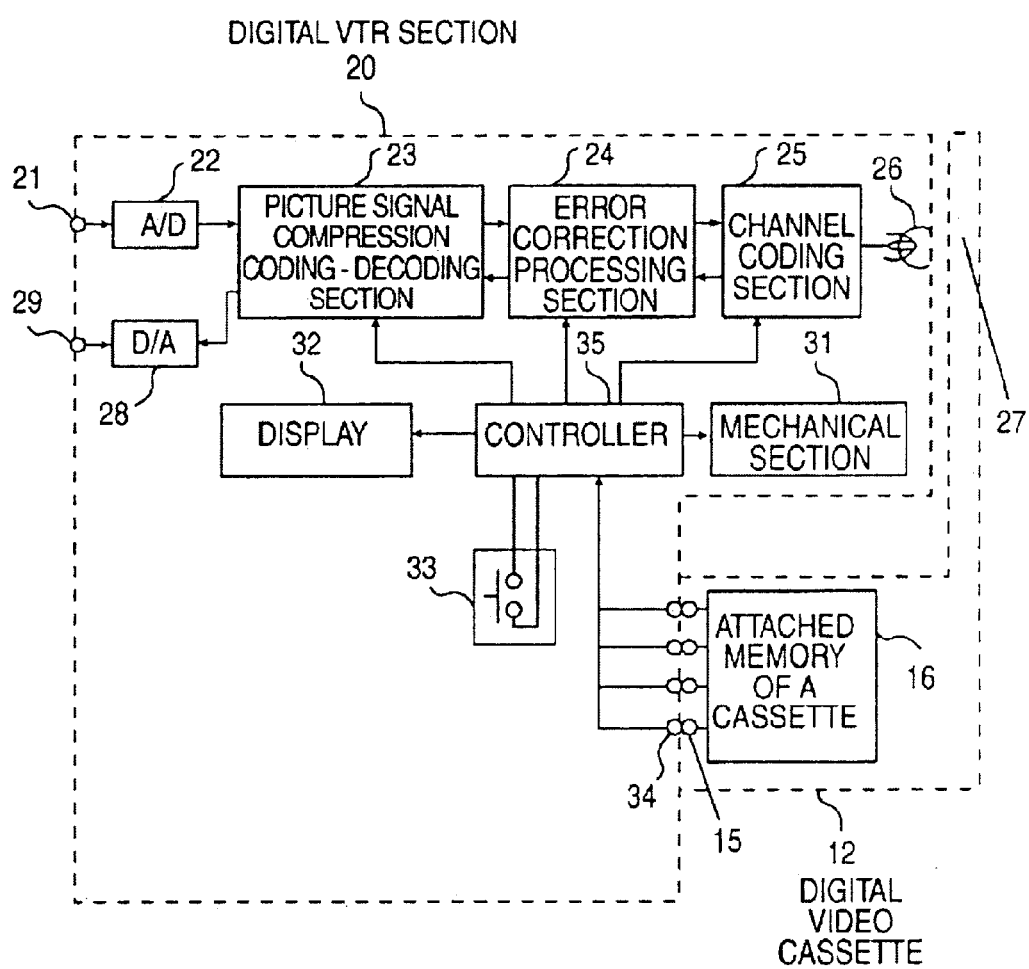
FIG. 2 is a block diagram showing an arrangement of a digital VTR unit of a camera/recorder shown in FIG. 1.

FIG. 2 is a block diagram showing the arrangement of the digital VTR unit in a camera/recorder 11 shown in FIG. 1. This digital VTR unit 20 includes an input terminal 21 which inputs a picture signal from the digital video camera unit, an output terminal 29 which outputs a picture signal, an A/D converter 22 which transforms a picture signal inputted from the input terminal 21, by analog-digital (hereafter, referred to simply as A/D) transformation, a picture signal compression coding/decoding unit 23 which performs the processing of compression coding of a picture signal outputted from the A/D converter 22 and the processing of decoding (extension) of a signal reproduced from a video tape, and a D/A converter 28 which transforms the signal decoded by the picture signal compression coding/decoding unit 23, by digital-analog (hereafter, referred to simply as D/A) transformation, and outputs that to the output terminal 29. Furthermore, the picture signal compression coding/decoding unit 23 is arranged to perform the processing of compression coding by using the discrete cosine transformation (hereafter, referred to simply as DCT).

The digital VTR unit 20 further includes an error correction processing unit 24 which performs addition of an error correction code to the signal subjected to compression coding by the picture signal compression coding/decoding unit 23, and performs error correction processing to the signal reproduced from a video tape and outputs the signal to the picture signal compression coding/decoding unit 23, a channel coding unit 25 which performs coding processing suitable for being recorded in a video tape, to the signal having an error correction code added by the error correction processing unit 24, and performs decoding processing corresponding to this coding processing, to the signal reproduced from the video tape and outputs the signal to the error correction processing unit 24, and a video head 26 which records the signal coded by the channel coding unit 25 into a video tape 27 in the digital video cassette 12, and reproduces the signal recorded in the video tape 27 and outputs that to the channel coding unit 25. Furthermore, it is arranged that the video head 26 includes a recording head and a reproducing head, and can perform recording and reproducing at the same time.

The digital VTR unit 20 further includes a mechanical unit 31 which performs loading of the digital video cassette 12, driving of a rotational drum having the video head 26 attached, and the like, a display 32 which performs various types of displays, an operational unit 33 by which the user performs various types of operations; a terminal 34 for the connection with the terminal 15 connected to the attached memory 16 of a cassette in the digital video cassette 12, and a controller 35 connected to the picture signal compression coding/decoding unit 23, the error correction processing unit 24, the channel coding unit 25, the mechanical unit 31, the display 32, the operational unit 33, and the terminal 34.

The operational unit 33 has a plurality of switches to perform specified instructions. In this embodiment, the switches include a mark-in switch for indicating a start point of the effective area in each scene or take, that is, a mark-in point, a mark-out switch for indicating a end point of the effective area in each scene or take, that is, a mark-out point, an OK/NG switch for indicating OK or NG (no good) to each scene or take, a take switch for indicating the take number,a CUE switch for indicating the cue point to be an index arbitrarily specified by the user, and a mode changeover switch for changing a mode to the mark mode, the CUE mode and the mark-in/out mode described later on. The OK/NG switch is arranged to shift between the OK indication state and the NG indication state for each pressing. A switch for indicating the scene number is not provided, and the reason is that the scene number is arranged to be automatically increased for each scene. The mark mode is a mode to make it possible that the user arbitrarily indicates the mark-in point and the mark-out point by using the mark-in switch and the mark-out switch, and the CUE mode is a mode to make it possible that the user arbitrarily indicates the cue point by using the CUE switch. The mark-in/out mode is a mode in which the start time of picture taking and the end time of picture taking of each scene are automatically set to the mark-in point and the mark-out point. The operational unit 33 may be provided integrally to the camera/recorder 11, or may be a remote control device. Furthermore, the mark-in point is arranged to be used as the in-point of the material used in editing.

The controller 35 is composed of a CPU (central processing unit), a ROM (read only memory), a RAM (random access memory), an input and output section, and the like, and is arranged to control, based on the time code signal, the total of the digital VTR unit 20 by performing the program stored in the ROM, by using the RAM as a working area.

Figure 3:
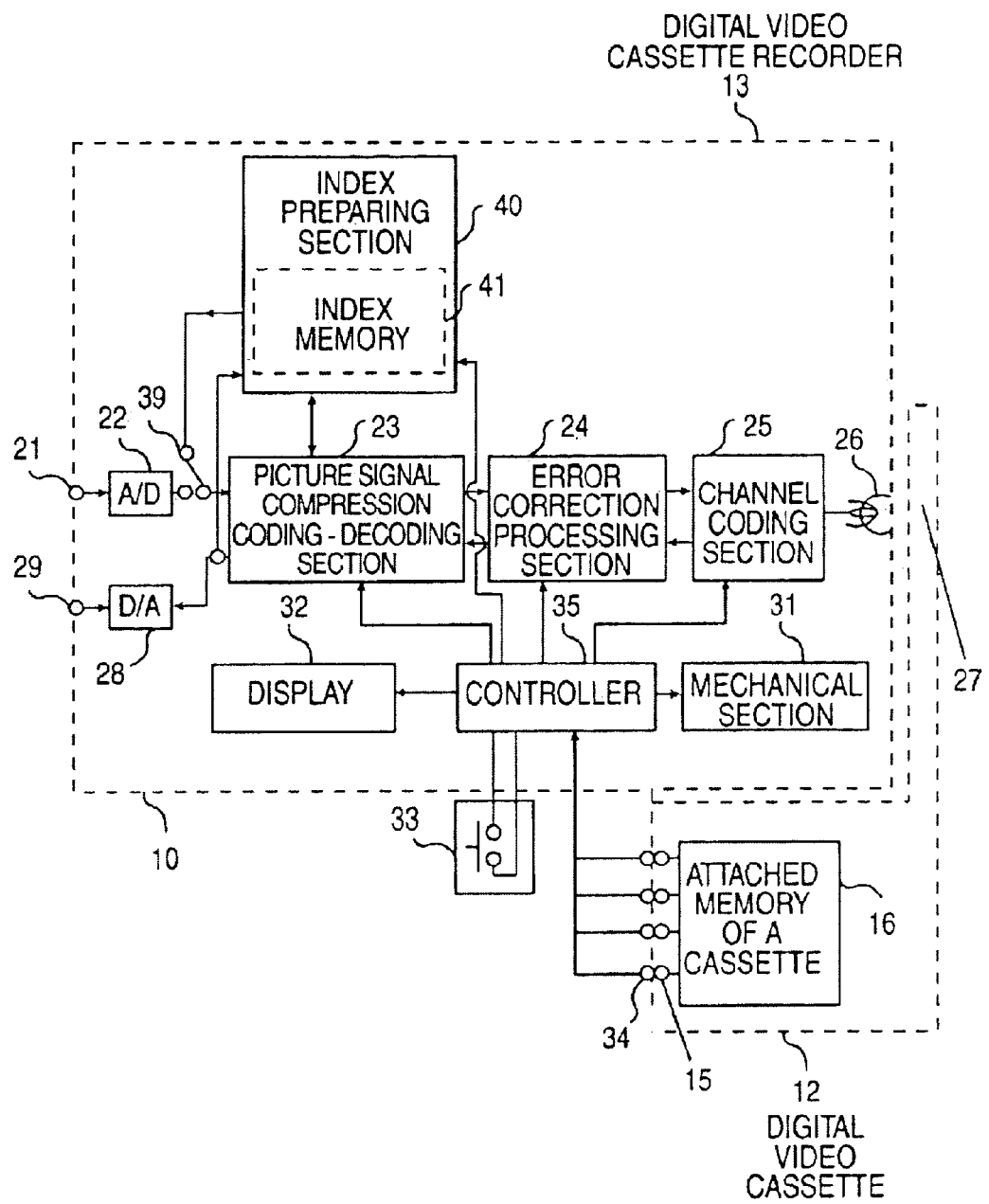
FIG. 3 is a block diagram showing an arrangement of a digital video cassette recorder shown in FIG. 1.

FIG. 3 is a block diagram showing the arrangement of the digital video cassette recorder 13 shown in FIG. 1. Since the large part of the arrangement of this digital video cassette recorder 13 is similar to the arrangement of the digital VTR unit 20 shown in FIG. 2, the same marks are given to the components similar to those of the digital VTR unit 20, and the description thereof will be omitted. The arrangement of the digital video cassette recorder 13 is different from that of the digital VTR unit 20, in that the digital video cassette recorder has an index generating unit 40 and a switch 39 for selecting either of the output signal of this index generating unit 40 or the output signal of the A/D converter 22 to output the output signal to the picture signal compression coding/decoding unit 23 and that the operational unit 33 has the function to indicate the preparation of index information. The index generating unit 40 is input with a signal output from the picture signal compression coding/decoding unit 23 to the D/A converter 28. The index generating unit 40 is controlled by the controller 35 and transmits and receives signals to and from the picture signal compression coding/decoding unit 23. The index generating unit 40 has an index memory 41 and a memory controller, not shown. The memory controller has a CPU which controls the index memory 41.

As described later in detail, the controller 35 and the index generating unit 40 shown in FIG. 3 select an index picture as the index picture serving as an aid used upon edition, from among the picture information recorded in the video tape 27, on the basis of the information of a mark-in point, a mark-out point, OK/NG, a take number, a cue point, and a scene number, and prepare index picture information to simply display this index picture, and perform the action to record this index picture information into the video tape 27. In this embodiment, the index picture information is the information about a picture made by further arranging, in a sheet of frame, a plurality of index pictures each made by compressing and reducing each index picture, in other words, the picture information showing a set screen of compressed and reduced index pictures.

In this embodiment, when recording the picture information in the video tape 27 by the digital VTR unit 20 shown in FIG. 2, or when reproducing the picture information recorded in the video tape 27, by the digital VTR unit 20 or the digital video cassette recorder 13 shown in FIG. 3, it is possible to indicate the mark-in point, the mark-out point, OK/NG, the take number, and the cue point by using the operational unit 33, and these indicated information and the information of the scene number are arranged to be recorded in the attached memory 16 of a cassette in the digital video cassette 12 and the video tape 27. The information of the mark-in point, the mark-out point and the cue point corresponds to an index information according to the present invention, and the information about the OK?NG, the take number and the scene number corresponds to the additional information according to the present invention.

A means for communicating between the attached memory 16 of a cassette in the digital video cassette 12, and the digital VTR unit 20 or the digital video cassette recorder 13 (hereafter, the digital VTR unit 20 or the digital video cassette recorder 13 is referred to simply as a main body 30), will be described with reference to FIG. 4 to FIG. 7, by way of example.

Figure 4:
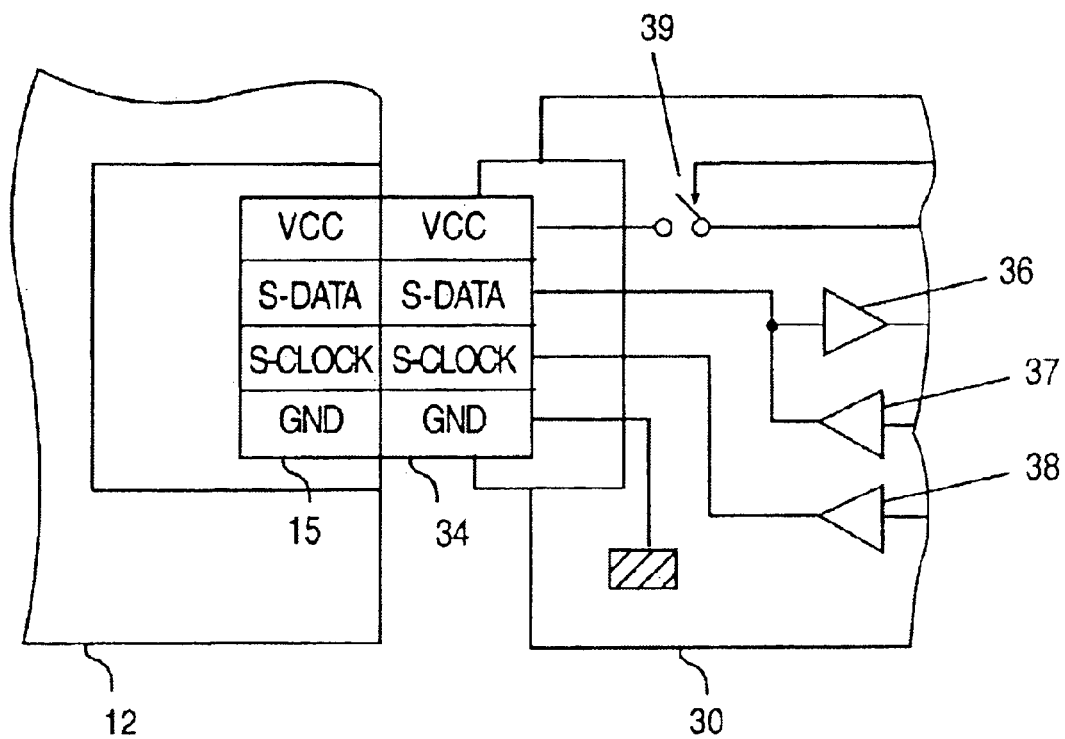
FIG. 4 is an explanatory diagram showing ameans for communicating with a cassette attached memory in the digital video cassette shown in FIG. 1.

FIG. 4 shows one example of the arrangement of the terminal 15 on the digital video cassette 12 side and the terminal 34 on the main body 30 side, and the arrangement of the interface on the main body 30 side. In this example, the terminals 15, 34 are each composed of 4 pins, and the detail is as follows: a power supply (VCC) pin, a serial data (S-DATA) pin, a serial clock (S-CLOCK) pin, and a ground (GND) pin, and the corresponding pins are arranged to be mutually connected. The power supply and the serial clock are arranged to be supplied from the main body 30. The ground pin is arranged to be grounded on the main body 30 side. The serial data pin is arranged to serve for common use of input and output. The interface on the main body 30 side has an input buffer 36 for wave form shaping whose input end is connected to the serial data pin, an output buffer 37 for wave form shaping whose output end is connected to the serial data pin, a serial clock buffer 38 whose output end is connected to the serial clock pin, and a switch 39 one end of which is connected to the power supply pin and the other end of which is connected to the power supply circuit in the main body 30. The main body 30 has a function to control ON/OFF of the power supply supplied to the digital video cassette 12, by using the switch 39, and this function functions as the reset of the attached memory 16 of a cassette.

Figure 5:
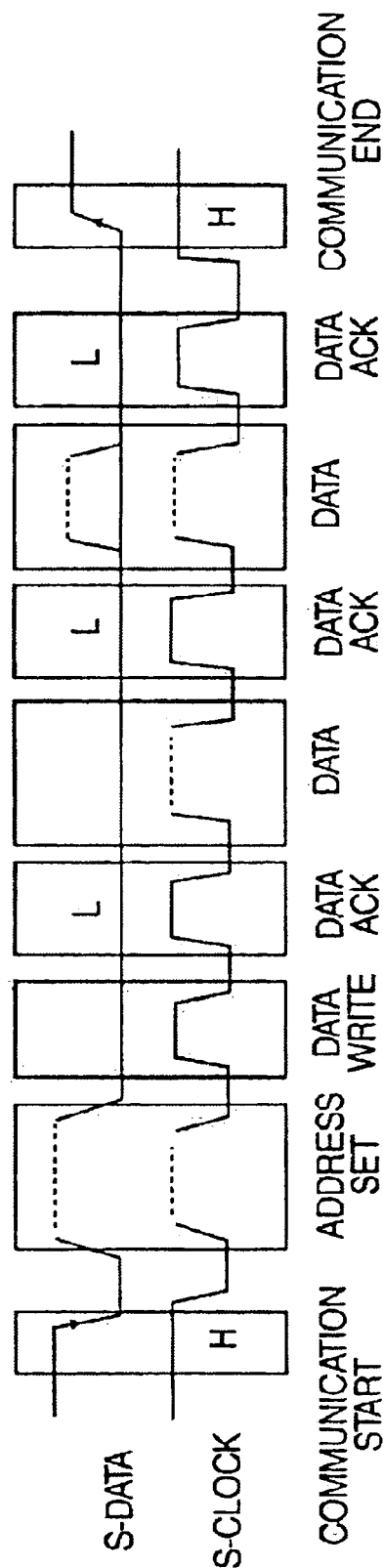
FIG. 5 is a diagram used to explain a protocol used when data is written in the cassette attached memory.
Figure 6:
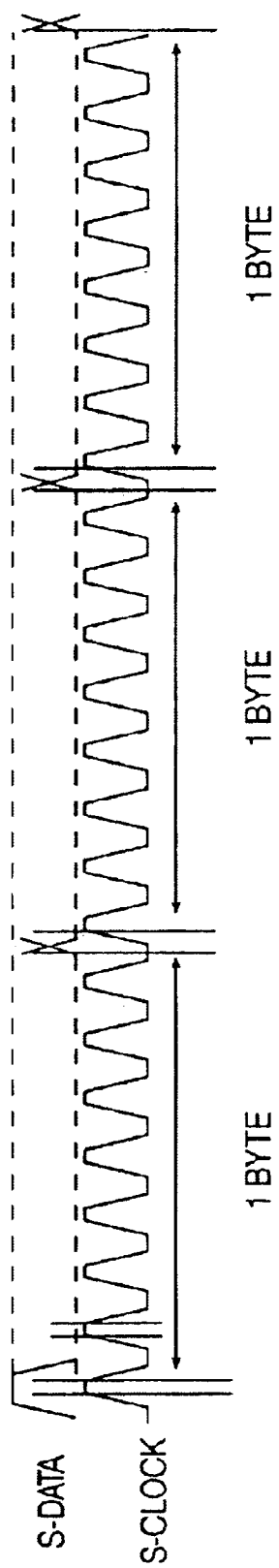
FIG. 6 is a diagram used to a relationship between a serial data and a serial clock in FIG. 5.

Next, by referring to FIG. 5 and FIG. 6, the protocol of communication at the time of write-in of the data from the main body 30 into the attached memory 16 of a cassette, will be described. In the protocol at the time of write-in, as shown in FIG. 5, the communication starts by the fall of the serial data S-DATA when the serial clock S-CLOCK is "H". After that, an address of 3 bytes is set, and further, the period to show the write-in of the data (data write) from the main body 30 to the attached memory 16 of a cassette (the serial data S-DATA is "L" when the serial clock S-CLOCK is "H"), continues. At the time of receiving the data up to this, the attached memory 16 of a cassette outputs "L" to the serial data S-DATA in the next period of the data ACK. After that, the data are written in the attached memory 16 of a cassette while handshake is performed by the data ACK and the data, for every 1 byte. The number of data after address set has variable-length. In FIG. 5, such an example that the data for 2 bytes are written in after the address of 3 bytes has been set, is shown. For example, if the set address is 0100 h (h shows a hexadecimal number), and the data are 0AA h and 055 h, the data 0AA h are written in the address 0100 h, and the data 055 h are written in the address 0100 h. The communication finishes by the rise of the serial data S-DATA when the serial clock S-CLOCK is "H". The effective term of the data is the term of "H" of the serial clock S-CLOCK. The relation between the serial data S-DATA and the serial clock S-CLOCK, as for the address set and the data, is shown in FIG. 6. As shown in this figure, 8 clocks are necessary for the transmission of 1 byte of address or data.

Figure 7:
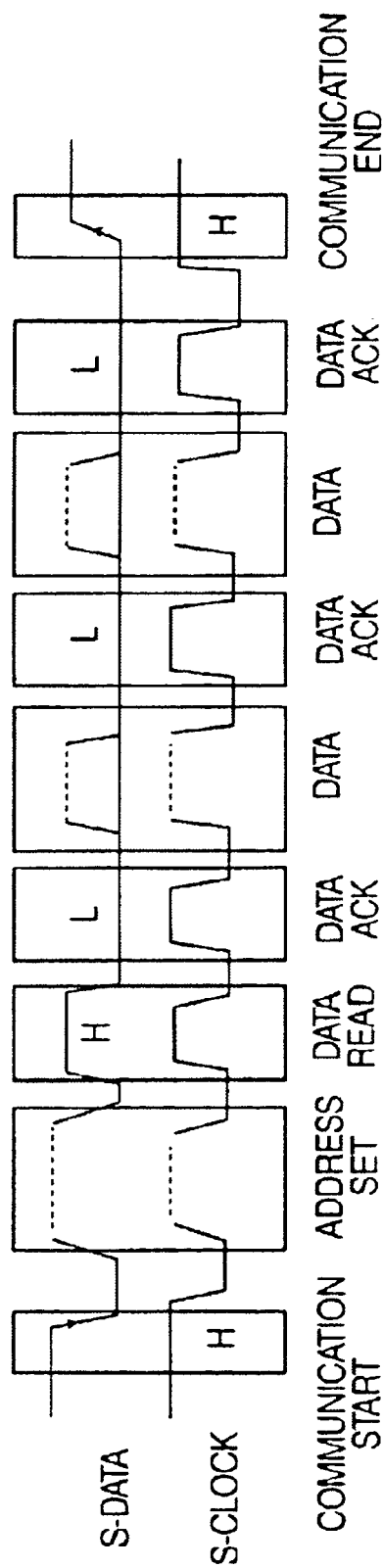
FIG. 7 is a diagram used to explain protocol set when data is read out from the cassette attached memory.

Next, by referring to FIG. 7, the protocol of communication at the time of read-out of data from the attached memory 16 of a cassette to the main body 30, will be described. When compared with the protocol at the time of write-in shown in FIG. 5, the protocol at the time of read-out is basically similar to the protocol at the time of read-out, except that after the address set, the period to show the read-out of the data (data read) from the attached memory 16 of a cassette to the main body 30 (the serial data S-DATA is "H" when the serial clock S-CLOCK is "H"), continues instead of the period to show the data write.

Figure 8:
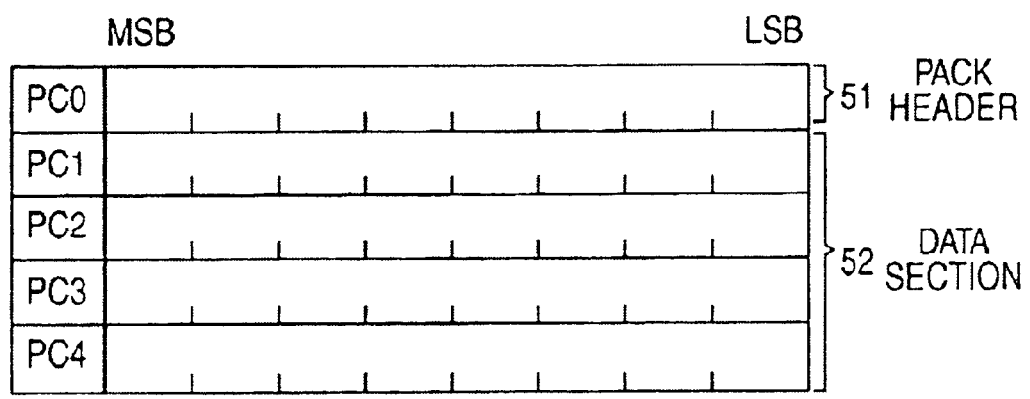
FIG. 8 is an explanatory diagram showing an arrangement of a pack which is a unit of data recorded in the cassette attached memory.

Next, by referring to FIG. 8 to FIG. 22, the data recorded in the attached memory 16 of a cassette will be described. First, FIG. 8 shows the structure of a pack as a unit of data recorded in the attached memory 16 of a cassette. This pack is composed of 5 bytes, and has a pack header 51 of 1 byte and a data section 52 of 4 bytes. The contents of the pack header 51 are different according to the type of the command. Furthermore, in the figure, the LSB shows the least significant bit and the MSB expresses the most significant bit.

FIG. 9 shows the data format of the attached memory 16 of a cassette. This data format has a main area 53 and an option area 54. Since the contents of the main area 53 are not directly related to the present invention, the description will be omitted. Furthermore, the format shown in FIG. 9 is specified in "Specifications of Consumer-Use Digital VCRs using 6.3 mm magnetic tape"(alias Blue Book).

The information related to the digital video cassette or the index picture is recorded in the option area 54. In this embodiment, it is prescribed that the packs concerning the index pictures includes packs IPn1, IPn2 (n=1, 2, . . . ; n is increased according to the shift of the scene or take) related to the information such as the mark-in, the mark-out and the like, packs CUEn (n=1, 2, . . . , n; n is incremented whenever the cue point is designated) concerning the information of the cue points, and packs IPabb1, IPabb2 concerning the information for specifying the recording position on the video tape 27 of the index picture information that is the picture information of a picture containing a group of index pictures. In this embodiment, the content of the pack header of a pack concerning the index picture is made to be "FBh".

FIG. 10 shows the outline of the contents of the pack IPn1. In this pack IPn1, it is arranged that in the digital section 52, a flag (in FIG. 10, noted "OK") showing the high ranking 1 byte of the relative value of the mark-out point, the scene number, the take number, and OK/NG, is recorded. FIG. 11 shows the outline of the contents of the pack IPn2. In this pack IPn2, it is arranged that in the data section 52, the low ranking 1 byte of the relative value of the mark-out point and the time code (hour, minute, second)of the mark-in point, are recorded. Here, the time code means the inherent positional information (time information) for each frame recorded on a tape.

The relative value of the mark-out point shows the relative value of the time code from the mark-in point of the mark-out point, and is arranged to be shown by the total of 2 bytes of the high ranking 1 byte in the pack IPn1 and the low ranking 1 byte in the pack IPn2. It is arranged that the maximum value of the scene number is 999 and the maximum value of the take number is 15. It is arranged that in the flag showing OK/NG, "1" indicates OK and "0" indicates NG.

FIG. 12 shows the outline of the contents of the pack CUEn. In this pack CUEn, it is arranged that in the data section 52, the time code (hour, minute, second, frame) of the cue point is recorded.

Figures 14, 15, 16:
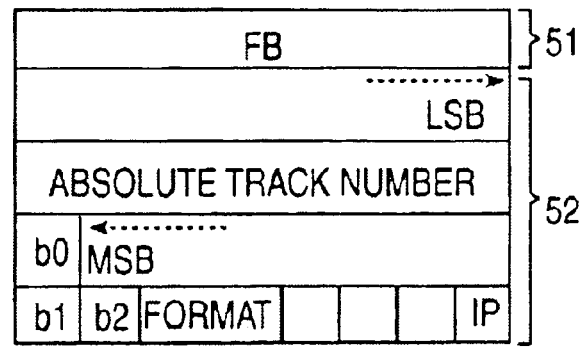

FIG. 12 shows the outline of the contents of the pack IPadd1. In this pack IPadd1, it is arranged that in the data section 52, the time code (hour, minute, second, frame) showing the recording position on the video tape 27 of the index picture information is recorded. FIG. 14 shows the outline of the contents of the pack IPadd2. In this pack IPadd2, it is arranged that in the data section 52, for the relief at the time of overlapping of the time code, the absolute track number showing the recording position on the video tape 27 of the index picture information is recorded.

Furthermore, in FIG. 10 to FIG. 14, the 3 bits noted b2, b1, b0 are used as the sub header, and when b2, b1, b0 are 0, 0, 0, to be the pack IPadd1 is expressed, and when b2, b1, b0 are 0, 0, 1, to be the pack IPadd2 is expressed, and when b2, b1, b0 are 0, 1, 0, to be the pack IPn1 is expressed, and when b2, b1, b0 are 0, 1, 1, to be the pack IPn2 is expressed, and when b2, b1, b0 are 1, 0, 0, to be the pack CUEn is expressed.

FIG. 15 to FIG. 19 show the detailed contents of the packs IPn1, IPn2, CUEn, IPadd1, IPadd2, respectively. Each has a specified value inserted into each specified position of the header section and the data section, and in FIG. 16 to FIG. 18, TENS of FRAMES expresses a value of tens of frames, UNITS of FRAMES expresses a value of units of frames, TENS of SECONDS expresses a value of tens of seconds, UNITS of SECONDS expresses a value of units of seconds, TENS of MINUTES expresses a value of tens of minutes, UNITS of MINUTES expresses a value of units of minutes, TENS of HOURS expresses a value of tens of hours, and UNITS of HOURS expresses a value of units of hours.

Figure 20:
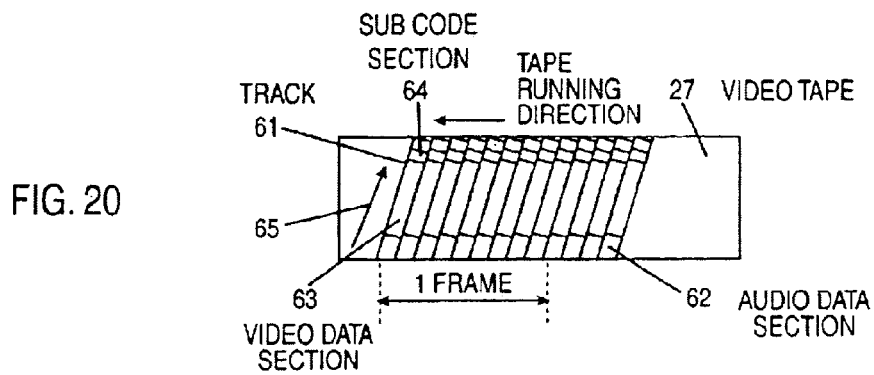
FIG. 20 is an explanatory diagram showing a recording pattern on a video tape in the digital video cassette shown in FIG. 1.

With reference to FIG. 20 to FIG. 27, the data recorded in the video tape 27 will be described. Here, the description will be given, supposing that an NTSC signal is recorded and reproduced. FIG. 20 shows the recording pattern on the video tape 27. On the video tape 27, 1 frame is composed of 10 tracks. Each track 61 has an audio data section 62, a video data section 63, and a sub code section 64. Furthermore, in the figure, the arrow shown by the numeral 65 expresses the running direction of the head, that is, the order of recording and reproduction of the data.

Figure 21:
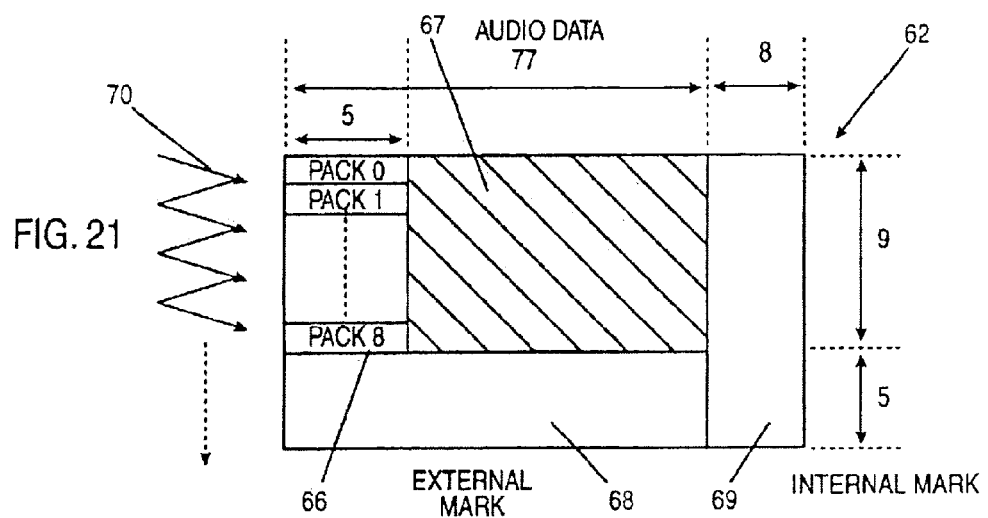
FIG. 21 is an explanatory diagram showing a structure of data recorded in an audio data portion shown in FIG. 20.

FIG. 21 shows the structure for the data recorded in the audio data section 62 in FIG. 20. In the audio data section 62, data are recorded, which are arranged such that an external mark of 77×5 bytes is added to a block of 77×9 bytes composed of audio auxiliary data 66 of 5×9 bytes and audio data 67 of 72×9 bytes, and an internal mark 69 of 8×14 bytes is further added to that. In the figure, the arrow shown by the numeral 70 indicates the direction of recording and reproduction. For example, of a 16-bit audio data obtained by employing a sampling frequency of 48 kHz, a first channel amount thereof is interleaved and recorded on five tracks positioned on a first half of one frame (10 tracks), and a second channel amount thereof is interleaved and recorded on five tracks positioned on a second half thereof. If a user intends to record a management information on a portion of the audio auxiliary data 66, then it is possible to record data of 12 bytes in view of the data format.

Figure 22:
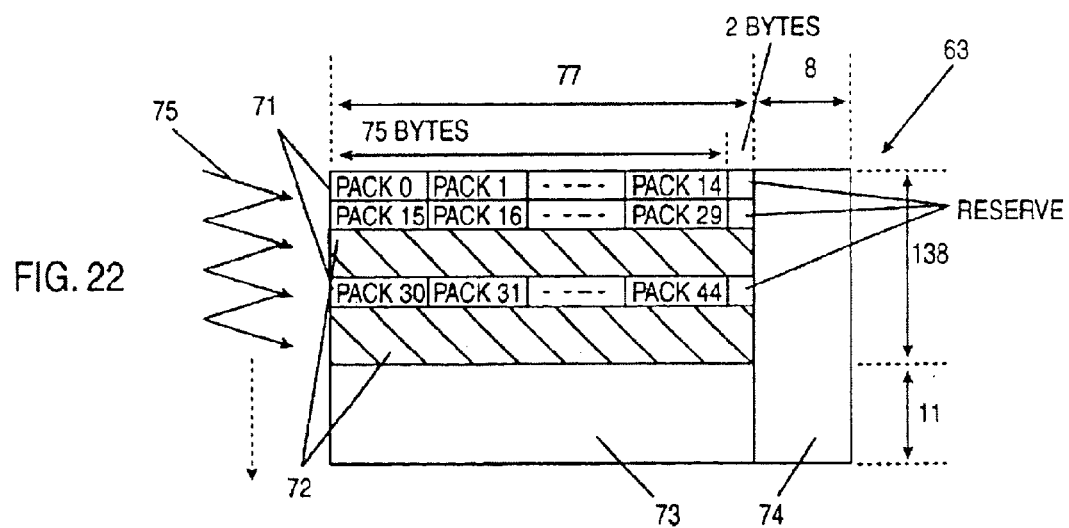
FIG. 22 is an explanatory diagram showing a structure of data recorded in a video data portion shown in FIG. 20.
Figure 23:
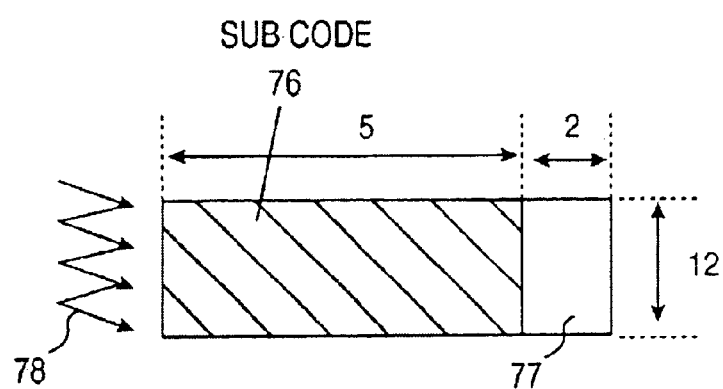
FIG. 23 is an explanatory diagram showing a structure of data recorded in a subcode data portion shown in FIG. 20.

FIG. 22 shows the data structure for 1 track recorded in the video data section 63 in FIG. 20. In the video data section 63, data are recorded, which are arranged such that an external mark 73 of 77×11 bytes is added to a block of 77×138 bytes composed of video auxiliary data 71 of 77×(2+1) bytes and video data 72 of 77×135 bytes, and an internal mark 74 of 8×149 bytes is further added to that. In the figure, the arrow shown by the numeral 75 shows the direction of recording and reproduction. In view of the format, the video auxiliary data 71 section has an area of 156 bytes which the user can use to record data.

FIG. 26 shows the data structure recorded in the sub code section 64 in FIG. 20. In the sub code section 64, the data arranged by adding an internal mark 77 of 2×12 bytes to a sub code 76 of 5×12 bytes, are recorded. In the figure, the arrow shown by the numeral 78 shows the direction of recording and reproducing. If the video and audio management information is recorded in the subcode portion 64, then the subcode section has an area of 24 bytes (except the pack header which the user can use to record data therein.

Figure 24:
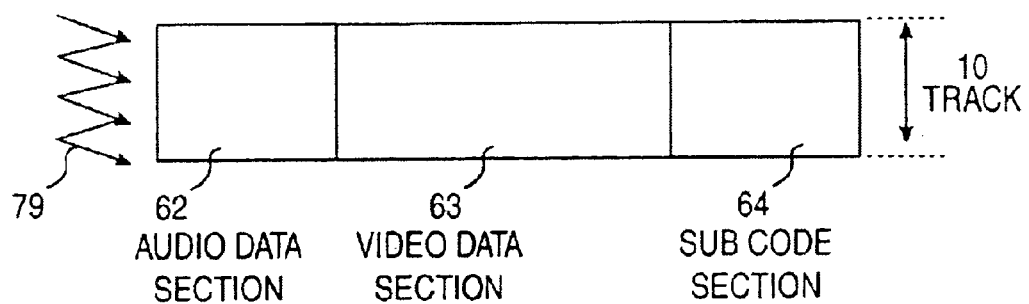
FIG. 24 is an explanatory diagram showing an arrangement of the audio data portion k the video data portion and the subcode portion on the video tape.

FIG. 24 shows the arrangement of the audio data section 62, the video data section 63, and the sub code section 64 on the video tape 27. In the figure, the arrow shown by the numeral 79 shows the direction of recording and reproduction. As shown in this figure, on the video tape 27, the sections are arranged in the order of the audio data section 62, the video data portion 63, and the sub code section 64 in the direction of recording and reproduction.

FIGS. 25 and 26 are diagrams showing a format of the subcode portion 64 formed on the video tape 27. FIG. 25 shows a data structure of one track amount of the five tracks positioned on the first half of the one frame (ten tracks). FIG. 26 shows a data structure of one track amount of the five tracks positioned on the second half of the one frame (ten tracks). IN these figures, an area of 5×12 bytes denoted by a subcode data is the subcode portion 64. An area of 2×12 bytes located on the left side of the subcode portion 64 is an ID code portion in a sync. block of the subcode which does not relate directly to the present invention and hence needs not to be described. A format described with reference to FIGS. 25 and 26 is described in the above-mentioned standard.

A user can use an area of 5×6 bytes (24 bytes excluding a pack header) of the subcode portion 64 shown in FIGS. 25 and 26. In this embodiment, the packs IPn1, IPn2, CUEn, IPadd1 and IPadd2 concerning the index picture shown in FIGS. 14 and 17 are recorded in this user area. In FIGS. 25 and 26, portions represented by FB(IPn1), FB(IPn2), FB(CUE), FB(IPadd1), and FB(IPadd2) are respectively portions where the packs IPn1, IPn2, IPadd1, and IPadd2. An area FB(CUE) is recorded when the cue point is designated upon the cue mode. The packs concerning the index pictures are similarly recorded on the first-half track side and the second-half track side. Therefore, the packs concerning the index picture and having the same contents are written ten times (ten track amount).

Figures 27A, 27B, 27C:
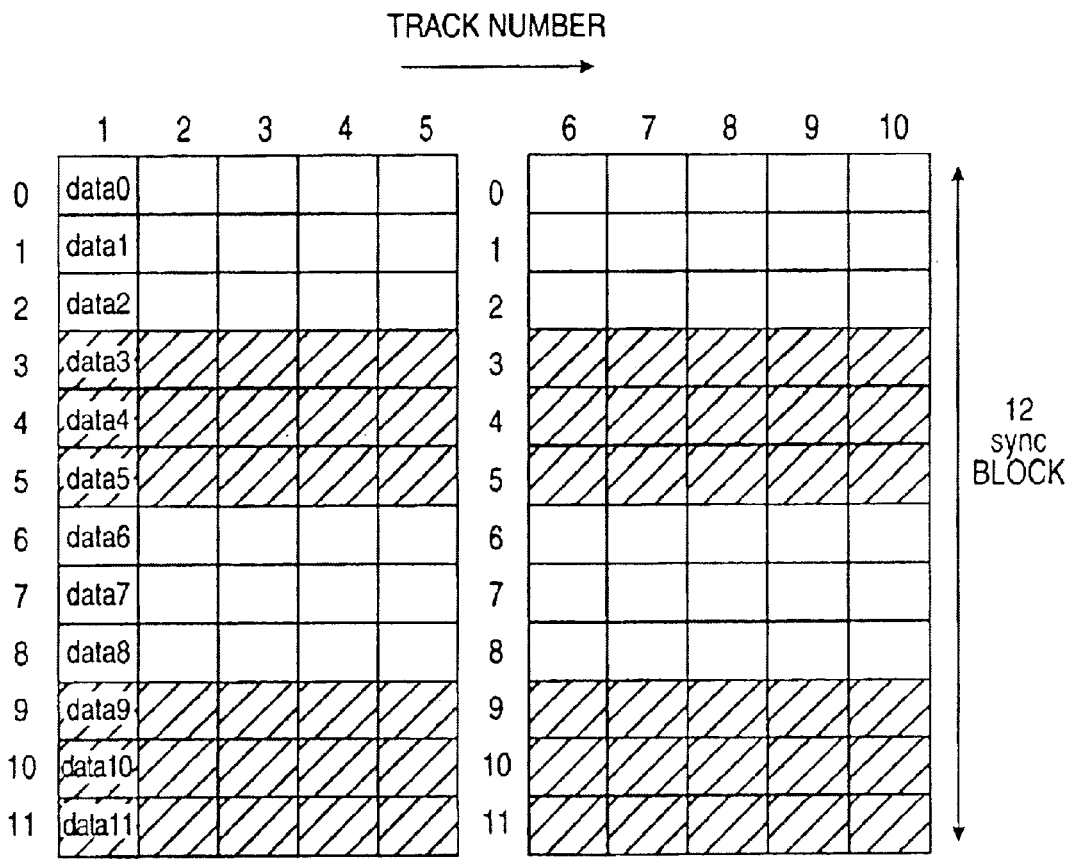
FIG. 27 is an explanatory diagram showing a physical arrangement of the subcode data on the video tape.

FIG. 27 is a diagram showing a physical arrangement of the subcode data on the video tape 17. One square in the figure corresponds to one pack. A blank portion without hatchings represents a portion which the user can use.

An operation relating to the preparation of the index picture information in the system shown in FIG. 1 and the index picture generating method according to these embodiment will be described.

Initially, there will be described the operation carried out when the mark-in point, the mark-out point, OK/NG, the take number, and the like are instructed by using the operational unit 33 upon the recording of the video information on the video tape 27 by the digital VTR unit 20 shown in FIG. 2. When the picture information is recorded on the video tape 27 by the digital VTR unit 20 shown in FIG. 2, the picture signal from the digital video camera unit is inputted into the digital VTR unit 20 through the input terminal 21. This picture signal is subjected to A/D transformation by the A/D converter 22, and is subjected to compression coding by the picture signal compression coding/decoding section 23, and an error correction code is added thereto by the error correction processing unit 24, and coding processing suitable for recording that into a video tape is performed by the channel coding unit 25, and the picture signal is recorded in the video tape 27 by the video head 26.

At the time of such recording operation, if the user selects the mark mode, and instructs the mark-in point, the mark-out point, OK/NG, and the take number by using the operational unit 33, the instructed information and the information of the automatically increased scene number are recorded in the option area 54 of the attached memory 16 of a cassette in the digital video cassette 12 and the sub code section 64 of the video tape 27, by the controller 35. The recording into the option area 54 of the attached memory 16 of a cassette is performed by such an action that the controller 35 sends the data to the attached memory 16 of a cassette through the terminals 34, 15, and the recording into the sub code section 64 of the video tape 27 is performed by such an action that the controller 35 sends the data to the channel coding unit 25. Furthermore, the information of the mark-in point, the mark-out point, OK/NG, the take number, and the scene number is recorded by the packs IPn1, IPn2 shown in FIG. 10, FIG. 11, FIG. 15, and FIG. 16. Furthermore, at the time of selecting the mark-in/out mode, the information start time and the picture taking end time of each scene are automatically made to be the mark-in point and the mark-out point, and the information is recorded in the attached memory 16 of a cassette and the video tape 27, and when the cue point is indicated by the operational unit 33, the information is recorded in the option area 54 of the attached memory 16 of a cassette and the video tape 27 by the pack CUEn shown in FIG. 12 and FIG. 17.

Figure 28:
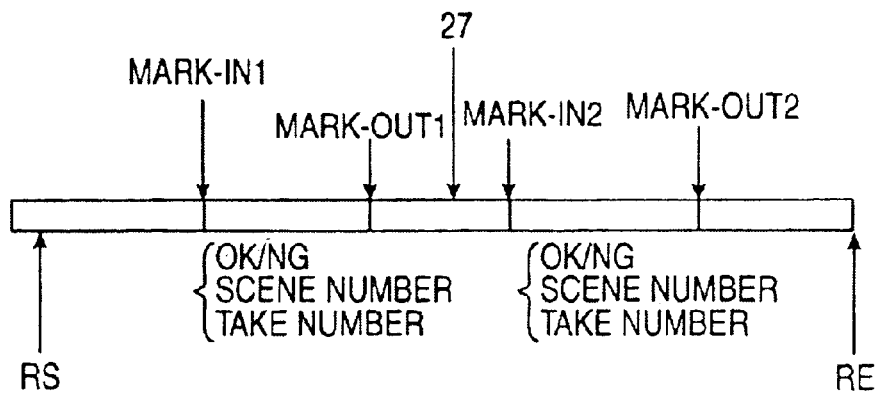
FIG. 28 is an explanatory diagram showing a state of the video tape when a mark-in point and a mark-out point are designated upon the recording of the video information in one embodiment of the present invention.

FIG. 28 typically shows the state of the video tape 27 at the time of specifying a pair of mark-in point and mark-out point at 2 places when recording the above mentioned picture information. In this figure, RS expresses the recording start point, RE expresses the recording end point, MARK-IN 1 expresses the first mark-in point, MARK-OUT 1 expresses the first mark-out point, MARK-IN 2 expresses the second mark-in point, and MARK-OUT 2 expresses the second mark-out point. To each of the first recording material between the first mark-in point and the first mark-out point, and the second recording material between the second mark-in point and the second mark-out point, the additional information of OK/NG, the take number, and the scene number is added.

Although the operation of indicating the mark-in point and the like at the time of recording the picture information has been described, but in this embodiment, it is also possible to indicate the mark-in point and the like by using the operational unit 33, when reproducing the picture information recorded in the video tape by the digital VTR unit 20 or the digital video cassette recorder 13 shown in FIG. 3. In this case, when indicating the mark-in point and the like, the user may operate the operational unit 33 after once stopping the reproduction, or may operate the operational unit 33 while continuing the reproduction. The method of recording the information such as the mark-in point indicated at the time of reproducing the picture information, into the attached memory 16 of a cassette and the video tape 27, is similar to that at the time of recording the picture information. Furthermore, when the picture information is reproduced, the signal recorded in the video tape 27 is reproduced by the video head 26, and decoded by the channel coding unit 25, and is subjected to the color correction processing by the error correction processing unit 24, and is decoded by the picture signal compression coding/decoding section 23, and is subjected to the D/A transformation by the D/A converter 28, and is outputted by the output terminal 29.

An operation of designating the cue point with the operation unit 33 when the picture information is recorded on the video tape 27 by the digital VTR unit 20 shown in FIG. 2 will be described. When the picture information is recorded on the video tape 27 by the digital VTR unit 20, the video signal from the digital video camera unit is input through the input terminal 21 to the digital VTR unit 20. This video signal is converted by the A/D converter 22 into the digital video signal, compression-coded by the picture signal compression coding/decoding unit 23, added with an error correction code by the error correction processing unit 24, subjected to a proper coding processing for recording on the video tape by the channel coding unit 25. Then, the video signal is recorded on the video tape 27 by the video head 26.

If a user designates a cue point with the operation unit 33 upon such recording operation, then the information about the cue point is recorded the option area 54 of the cassette attached memory 16 of the digital video cassette 12 and the subcode portion 64 of the video tape 27 under the control of the controller 35. The information is recorded on the option area 54 of the cassette attached memory 16 by transmitting data from the controller 35 through the terminals 34, 15 to the cassette attached memory 16. The information is recorded on the subcode portion 64 of the video tape 27 by supplying the data from the controller 35 to the channel coding unit 25. The information about the cue point is recorded in the form of the pack shown in FIGS. 12 and 17.

Figure 31:
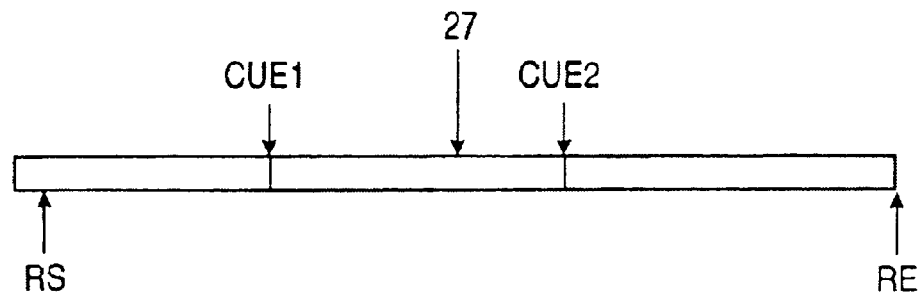
FIG. 31 is an explanatory diagram showing a state of the video tape when the cue point is designated upon the recording of the video information according to the embodiment of the present invention.

FIG. 31 is a diagram schematically showing a state of the video tape 27 presented when the cue points are designated at two points thereon upon the recording of the above video information. In this figure, RS represents a recording start point, RE represents a recording end point, CUE1 represents a first cue point, and CUE2 represents a second cue point.

An operation of designating the cue point upon the recording of the video information has been described. In this embodiment, it is possible to designate the cue point by using the operation unit 33 when the video information recorded on the video tape 27 is reproduced by the digital VTR unit 20 or the digital video cassette recorder 13 shown in FIG. 3. In this case, when the cue point is designated, a user may once stop the reproduction operation and then operate the operation unit 33, or may operate the operation unit 33 while the reproduction is being carried out. A method of recording the information about the cue point designated upon the reproduction of the video information on the cassette attached memory 16 and the video tape 27 is similar to that employed upon the recording of the video signal. When the video information is reproduced, the signal recorded on the video tape 27 is reproduced therefrom by the video head 26, decoded by the channel coding unit 25, subjected to the error correction processing by the error correction processing unit 24, converted by the D/A converter 28 into an analog signal which is then output from the output terminal 29.

Figure 29:
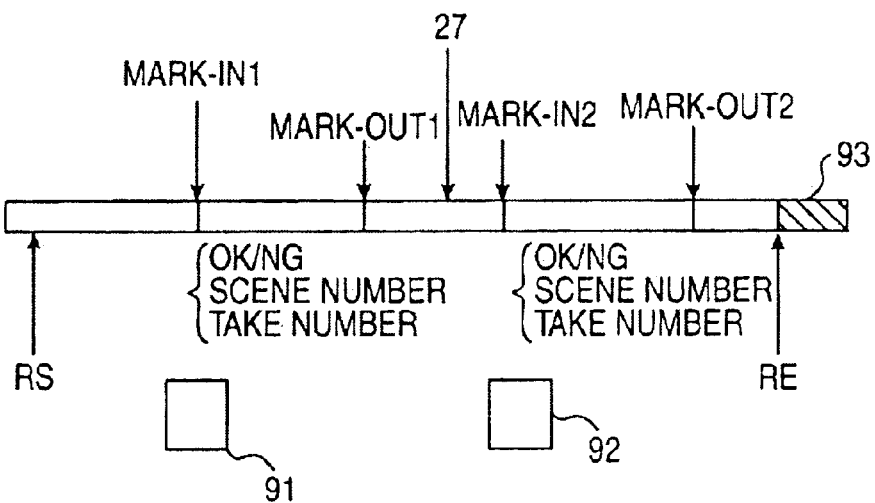
FIG. 29 is an explanatory diagram showing an example of a state of the video tape when the index picture information is generated according to the embodiment of the present invention.

Subsequently, there will be described with reference to FIG. 29 an operation for recording the video information on the video tape 27 as described above and recording the index picture information on the prepared video tape 27 by using the digital video cassette 12 having the cassette attached memory 16 and the video tape 27 in which the information such as the mark-in point, the cue point and so on is recorded. FIG. 29 typically shows the state of the video tape 27 at the time of preparing the index picture information. Preparation of the index picture information is performed by the digital video cassette recorder 13 shown in FIG. 3. When the user instructs preparation of the index picture information by using the operational unit 33, the controller 35 of the digital video cassette recorder 13 reads out the information of all mark-in points, that is, the time code from the attached memory 16 of a cassette, and controls the mechanical unit 31, and makes the video tape 27 pre-roll to the pre-roll point for the first mark-in point. Thereafter, under the control of the controller 35, the picture of the first mark-in point, that is, the index picture 91 is reproduced, and a signal corresponding to the decoded index picture 91 decoded by the picture signal compression coding/decoding unit 23 is supplied to the index generating unit 40, and then stored in the index memory 41. Subsequently, under the control of the controller 35, the video tape 27 is pre-rolled to the pre-roll point to reproduce the picture of the second mark-in point, that is, the index picture 92, and a signal corresponding to the decoded index picture 92 decoded by the picture signal compression coding/decoding unit 23 is supplied to the index generating unit 40, and then stored in the index memory 41. As for the third mark-in point and the following points, the control is similarly carried out.

Furthermore, the index generating unit 40 supplies a signal corresponding to the fetched index picture to the picture signal compression coding/decoding unit 23 for compressing and reducing the picture. The picture signal compression coding/decoding unit 23 performs DCT processing onto the sent signal by the block of a specified size, and sends the DC (direct current) component with respect to every block to the index generating unit 40. The index generating unit 40 prepares a compressed and reduced index picture by using the DC component for every block, and stores the data of this compressed and reduced index picture in a position of a specified address in the index memory 41, and prepares the index picture information as the picture information of the group picture of the compressed and reduced index picture (that is, the simple index picture). When the index generating unit 40 has stored the data of the compressed and reduced index picture for the specified capacity assigned for the index picture information to the index memory 41, the controller 35 shifts the switch 39, and outputs the index picture information from the index generating unit 40, and inputs that through the switch 39 into the picture signal compression coding/decoding unit 23, and controls the mechanical unit 31 so that the state may be a state capable of recording the signal in a specified position (for example, after the recording end point RE or after the recording start point RS) of the video tape 27. The index picture information outputted from the index generating unit 40 is compressed and coded by the picture signal compression coding/decoding unit 23, and is subjected to a specified processing in the color correction processing section 24 and the channel coding unit 25, and is recorded in a specified position of the video tape 27 by the video head 26.

Figure 30:
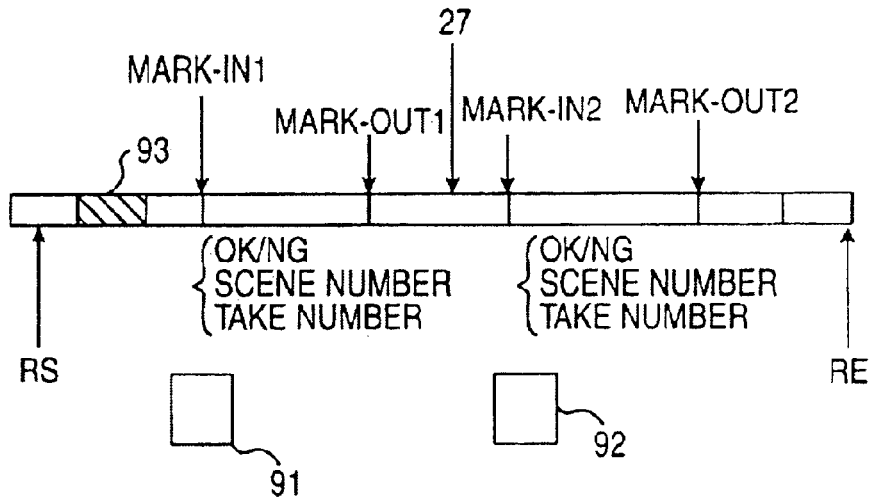
FIG. 30 is an explanatory diagram showing an example of a state of the video tape when the index picture information is generated according to the embodiment of the present invention.
Figure 32:
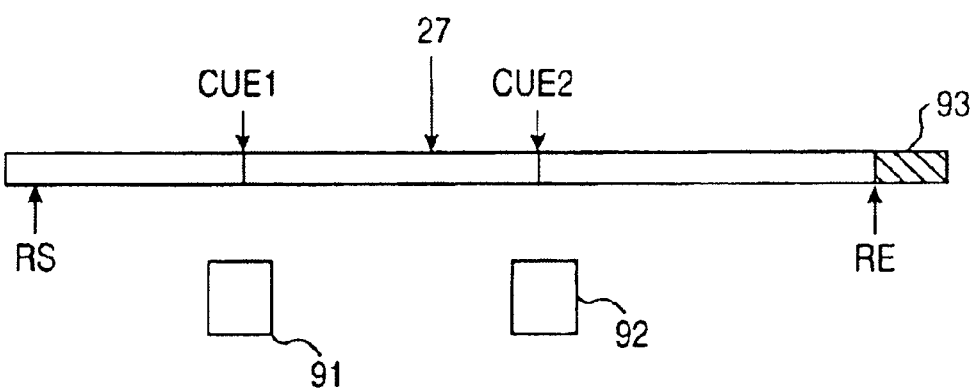
FIG. 32 is an explanatory diagram showing an example of a state of the video tape when the index picture information is generated according to the embodiment of the present invention.
Figure 33:
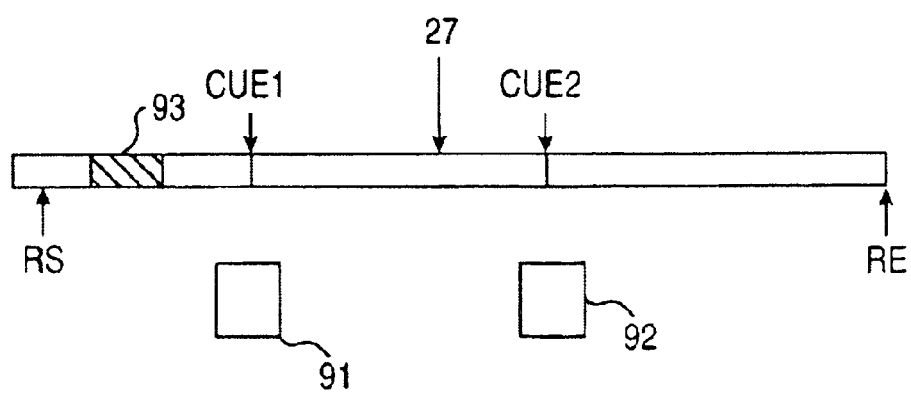
FIG. 33 is an explanatory diagram showing another example of a state of the video tape when the index picture information is generated according to the embodiment of the present invention.

FIGS. 29 and 32 shows an example in which the index picture information 93 is recorded following after the recording end point RE. Furthermore, FIGS. 30 and 33 shows an example in which the index picture information 93 is recorded following after the recording start point RS, after preparing the index picture information similarly to the example of FIGS. 29 and 32. By the way, after the recording start point RS, the black signal is recorded originally for several seconds, and even if the index picture information 93 is recorded in this position, the picture information is not broken.

When the index picture information 93 has been recorded in the video tape 27, the controller 35 records the time code of the recording position on the video tape 27 of the index picture information 93 into the option area 54 of the attached memory 16 of a cassette by using the packs IPadd1, IPadd2, and records that in the sub code section 64 of a specified position (for example, a position equal to the recording position of the index picture information 93 or a position near the position) of the video tape 27.

Figure 34:
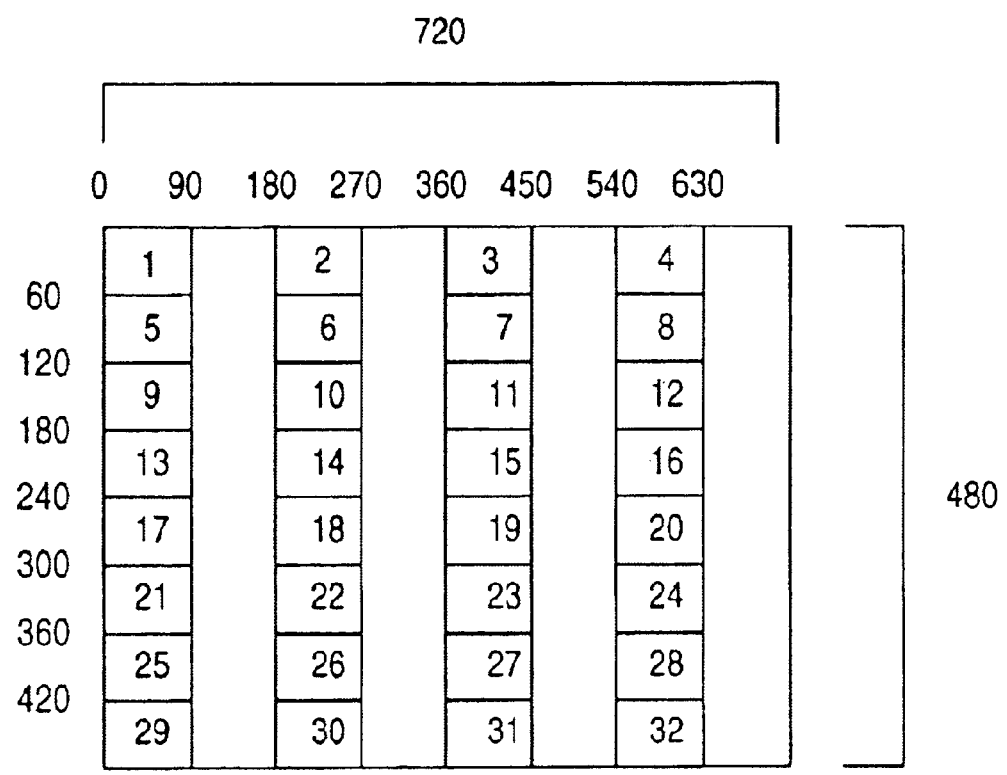
FIG. 34 is an explanatory diagram used to explain an example of the picture displayed based on the index picture information according to the embodiment of the present invention.

FIG. 34 is an explanatory diagram showing one example of a picture displayed by the index picture information. This example is an example of NTSC system, and in 1 frame of 720 dots×480 lines, up to 32 pieces of compressed and reduced index pictures are arranged. In the figure, the parts marked with the reference numerals 1 to 32 represent index pictures, and the index pictures are recorded in order of time (in the increasing order of the time code) and in order of the reference numerals 1 to 32 in the figure. If there are thirty-two index pictures or more, the index picture information is recorded on a plurality of frames.

Furthermore, until now, the case where the picture of each mark-in point, each cue point or the like is made to be an index picture unconditionally, has been described, but in the present embodiment, it is also possible that a picture agreeing with desired conditions among the pictures of respective mark-in points, is selected and made to be an index picture, on the basis of the information of OK/NG, the take number, and the scene number as the additional information.

Figure 35:
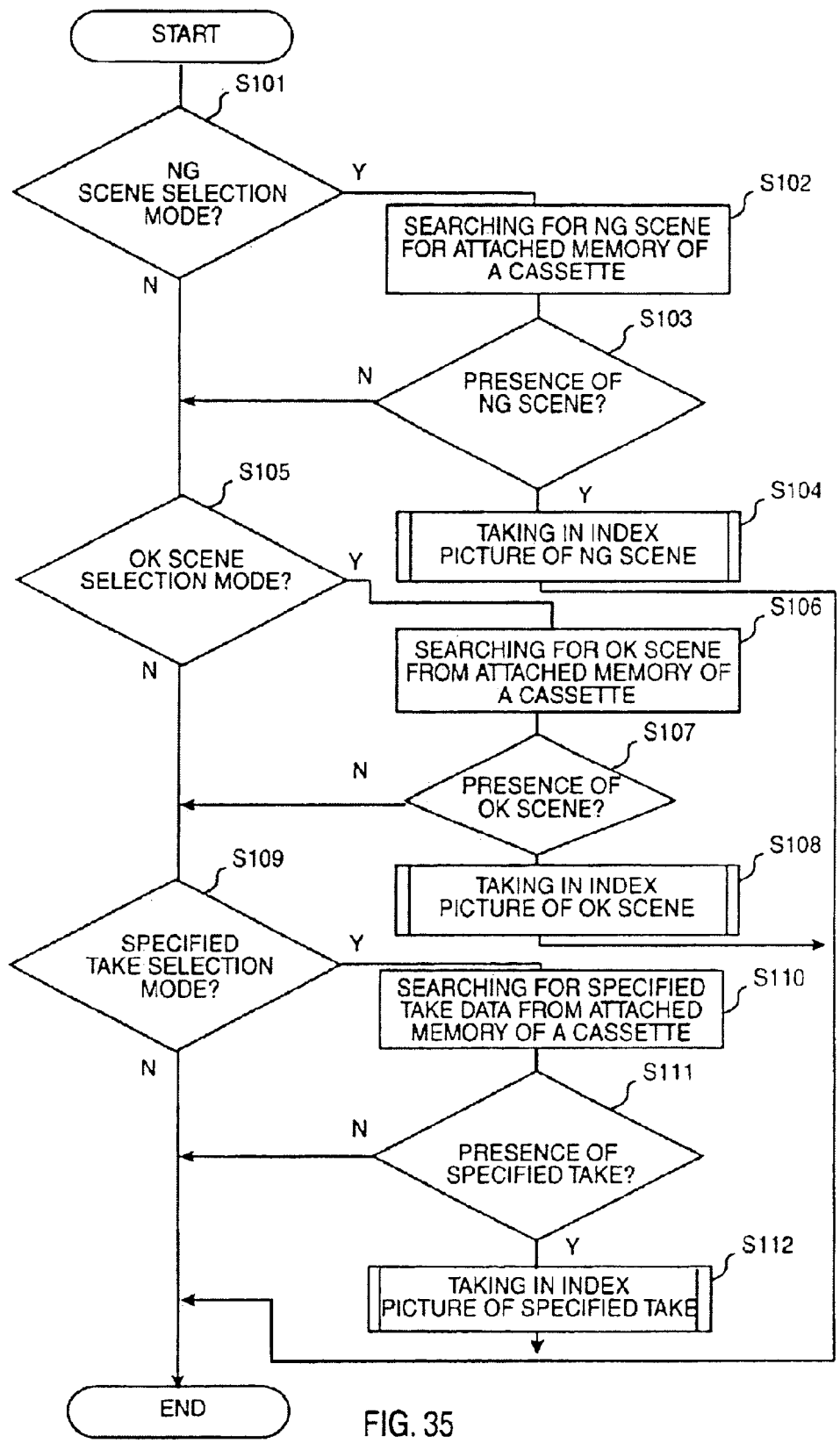
FIG. 35 is a flowchart used to explain an example of an index picture selecting operation according to the embodiment of the present invention.

FIG. 35 is a flow chart showing the action of the controller 35 in the case of selecting the index picture on the basis of the information of OK/NG and the take number. In this example, the NG scene selection mode selecting only the NG scene, the OK scene selection mode selecting only the OK scene, and the specified take selection mode selecting only the take with a specified take number, are specified. These modes are arranged to be selected by the operation of the operational unit 33 by the user. In the action shown in FIG. 35, the controller 35 first judges whether the mode is the NG scene selection mode or not (step S101). When the mode is the NG scene selection mode (Y), it searches for an NG scene from the attached memory 16 of a cassette (step S102). Specifically, it checks in turn the flags showing OK/NG in the pack IPn1 recorded in the option area 54 of the attached memory 16 of a cassette. Next, the controller 35 judges whether there is an NG scene or not (step S103), and if there is an NG scene (Y), it takes in the picture of the mark-in point in the NG scene as an index picture (step S104), and finishes the action of the selection of the index picture.

In the case where the mode is not the NG scene selection mode (step S101; N) and in the case where there is no NG scene (step S103; N), the controller 35 judges whether the mode is the OK scene selection mode or not (step S105). In the case where the mode is the OK scene selection mode (Y), it searches for an OK scene from the attached memory 16 of a cassette (step S106). Specifically, it checks in turn the flags showing OK/NG in the pack IPn1 recorded in the option area 54 of the attached memory 16 of a cassette. Subsequently, if there is an OK scene (Y), it takes in the picture of the mark-in point in the OK scene as an index picture (step S108), and finishes the action of the selection of the index picture.

In the case where the mode is not the OK scene selection mode (step S105; N) and in the case where there is no OK scene (step S107; N), the controller 35 judges whether the mode is the specified take selection mode or not (step S109). In the case where the mode is the specified take selection mode (Y), it searches for specified take data from the attached memory 16 of a cassette (step S110). Specifically, it checks in turn the take numbers in the pack IPn1 recorded in the option area 54 of the attached memory 16 of a cassette, and extracts a take number agreeing with the specified take number. Furthermore, the specifying of the take number is arranged to be performed by the operation of the operational unit 33 by the user. Next, the controller 35 judges whether there is a specified take or not (step S111), and if there is a specified take (Y), it takes in the picture of the mark-in point in the specified take as an index picture (step S112), and finishes the action of the selection of the index picture. In the case where the mode is not the specified take selection mode (step S109; N) and in the case where there is no specified take (step S111; N), the controller 35 finishes the action of the selection of the index picture.

Furthermore, in the example shown in FIG. 32, a case of selecting an index picture by specifying the scene number, is not shown, and this can be realized similarly to the case of selecting an index picture by specifying the take number.

As described above, in this embodiment, even if the index picture information is not generated upon the image pickup, it is possible to generate the index picture information based on the index information (i.e., information of the mark-in point, the mark-out point, the cue point) recorded on the cassette attached memory 16 and the video tape 27 and to then record the index picture information on the video tape 27. Therefore, even when the shooting processing is carried out with an equipment having no function to generate the index picture information, if the index picture information is later generated and then recorded on the video tape 27, then it is possible to efficiently carry out an edition work using the index picture information (e.g, to improve an operation for searching for the head of a desired position of the video tape 27 and to inform outlines of the video information recorded on the video tape 27).

Moreover, according to this embodiment, it is possible to select a picture satisfying a desired condition based on the index information and the additional information to employ it as the index picture, which enables more sufficient editing work.

According to this embodiment, since the index information and the additional information are recorded on both the cassette attached memory 16 and the video tape 27, even if the filming is carried out with the digital video cassette 12 having no cassette attached memory 16, then it is possible to generate the index picture information and then record it on the video tape 27.

An operation of a modifying processing for modifying the index information, the additional information and the index picture information recorded on the cassette attached memory 16 and the video tape 27 will be described with reference to FIGS. 36 and 37 which are flowcharts therefor. This modifying processing is carried out by the digital video cassette recorder 13 shown in FIG. 3. When the user issues a command to carry out the modifying processing by using the operation unit 33, the controller 35 carries out the modifying processing shown in FIGS. 36 and 37. When this modifying processing is carried out, the controller 35 has already read out the index information and the additional information recorded in the cassette attached memory 16. This reading operation is automatically carried out when the digital video cassette 12 is loaded onto the digital video cassette recorder 13.

In the modifying processing, the controller 35 initially determines whether or not the mark-in switch is pressed (in step S101). If it is determined that the mark-in switch is pressed (as represented by Y in the figure), the controller 35 temporarily stores the time code of the mark-in point (in step S102). If it is determined that the mark-in switch is not pressed (S101; N), the controller 35 determines whether or not the mark-out switch is pressed (in step S103). If it is determined that the mark-out switch is pressed (as represented by Y in the figure), the controller 35 temporarily stores the time code of the mark-out point (in step S104).

After storing the time codes of the mark-in and mark-out points (in steps S102 and step S104), the controller 35 compares the time codes of a pair of the mark-in and mark-out points (in step S105) and then determines whether or not the time code of the mark-in point is smaller that the time code of the mark-out point (in step S106). If it is determined that the time code of the mark-in point is smaller that the time code of the mark-out point, the controller registers the mark-in point and the mark-out point (in step S107). The pair of a mark-in point and a mark-out point are the mark-in point and the mark-out point in the same scene and the take. In the modifying processing shown in FIGS. 36 and 37, it is possible to modify only the mark-in point or the mark-out point. When only the mark-in point or the mark-out point is modified, a modified point is compared with a point which is not modified.

If it is determined that the mark-out switch is not pressed (S103; N), if it is determined that the time code of the mark-in point is smaller that the time code of the mark-out point (S106; N), or if it is determined that registration of the mark-in point and the mark-out point is finished (in step S107), then the controller 35 determines whether or not the cue switch is pressed (in step S108). If it is determined that the cue switch is pressed (as represented by Y), then the controller temporarily stores the time code of the cue point (in step S109; Y) and then determines whether or not the cue point is different from the cue point which has already been designated (in step S110). If it is determined that the cue point is different therefrom (S110; Y), then the controller 35 registers the different cue point (in step S111).

If it is determined that the cue switch is not pressed (S108; N), if it is determined that the cue switch is not different (S110; N) or if it is determined that registration of the different cue point is finished (step S111), then the controller 35 determined whether or not the OK/NG switch is pressed (in step S112). If it is determined that the OK/NG switch is pressed, the controller 35 registers the designated OK or NG flag. If it is determined the OK/NG switch is not pressed (step S112; N) or if the registration of the OK or NG flag is finished (step S113), then the controller 35 determined whether or not any registration has been carried out (S114). If it is determined that the registration has been carried out (as represented by Y), the controller 35 rewrites the packs IPn1, IPn2, CUEn in the cassette attached memory 16 and the video tape 27.

The controller 35 determines whether or not a function to generate the index picture information is provided (in step S116). If it is determined that the function is provided (Y), then the controller modifies the index picture information (in step S117). If it is determined that the function to generate the index picture information is not provided (in step S116; N) or if the modification of the index picture information (step S117) is finished, then the controller 35 determines whether or not the modification command has been executed. (in step S118). If it is determined that the modification command has already been executed (Y), the controller 35 determines whether or not a function to generate the index picture information is determined (in step S119). If it is determined that the function is provided (Y), then the controller writes the modified index picture information in the video tape 27 and then writes the packs IPadd1 and IPadd2 in the cassette attached memory 16 and the video tape 27 (in step S120), thereafter finishing the modifying processing. If it is determined that the function to generate the index picture information is not provided (step S119; N), then the modifying processing is ended. If it is determined that no registration is executed (step S114; N) or if it is determined that the modification command has not been executed (S118; N), then the processing returns to step S101.

Figure 36:
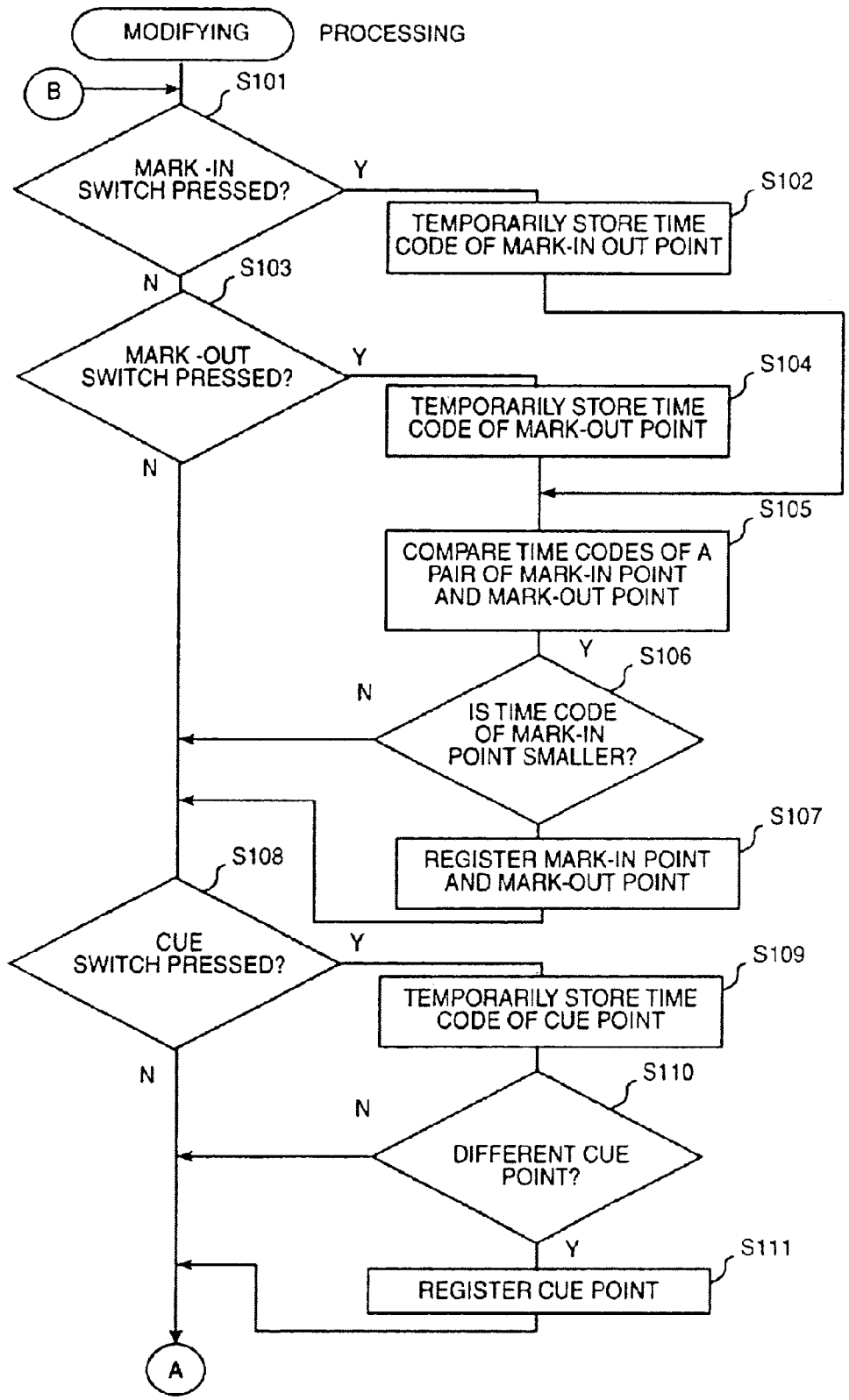
FIGS. 36 and 37 are flowcharts used to explain an operation for modifying an auxiliary information according to the embodiment of the present invention.
Figure 37:
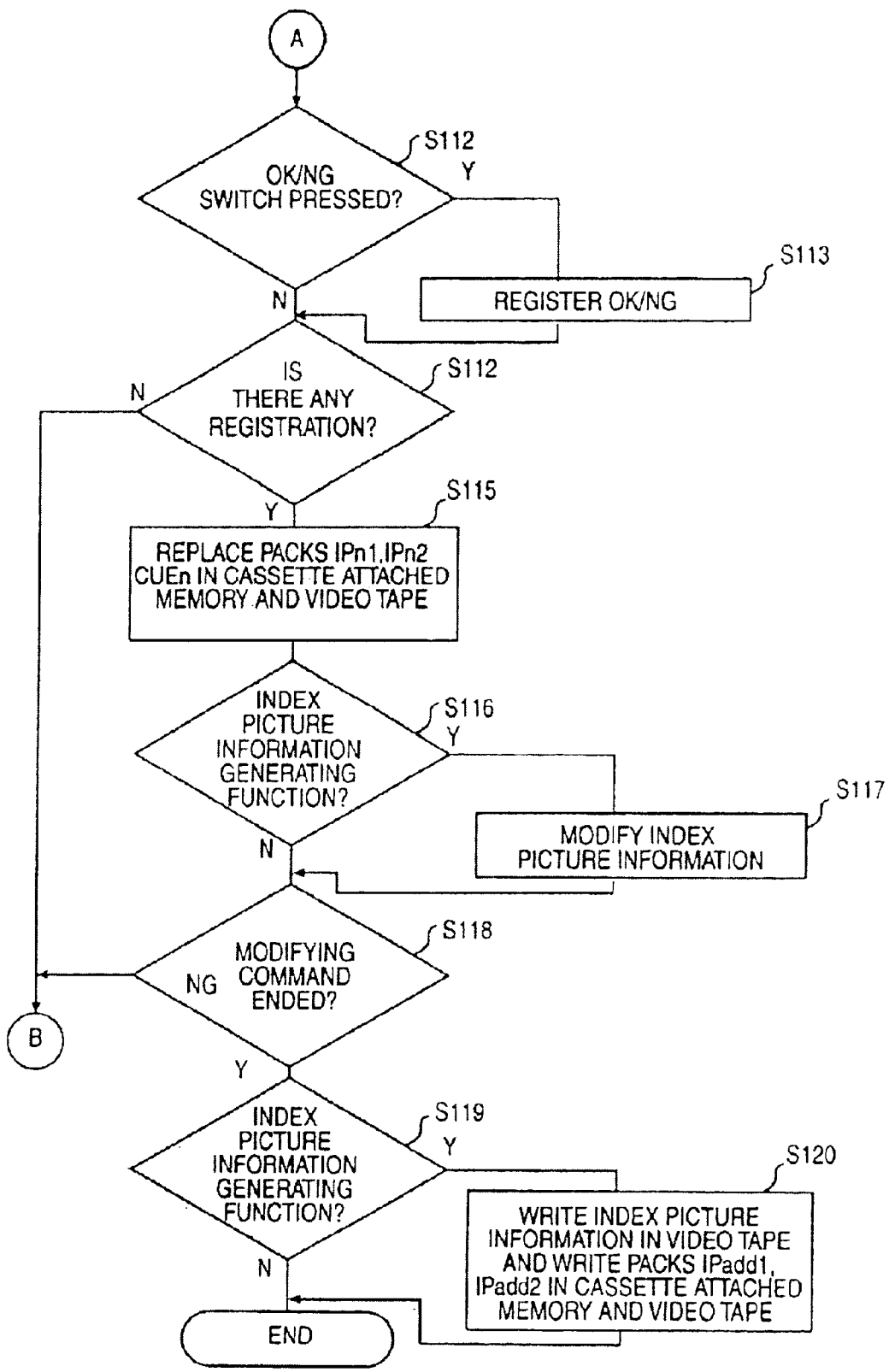

The modifying processing shown in FIGS. 36 and 37 includes a processing for changing and adding the mark-in point and the like. The mode for changing the mark-in point and the like and the mode for adding it are switched by using a mode switch provided in the operation unit 33.

Figures 38, 39A, 39B:
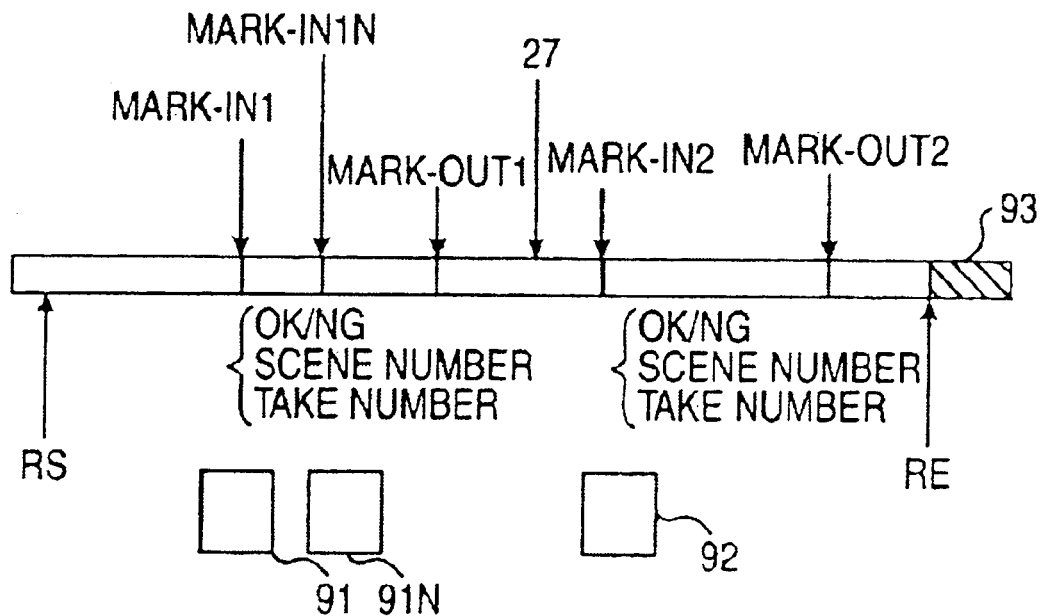
FIG. 38 is a diagram used explain change of the mark-in point according to the embodiment of the present invention.

An operation for changing the mark-in point will specifically be described with reference to FIG. 38. FIG. 38 is a diagram schematically showing a state of the video tape 27 presented when a mark-in point of one scene on the video tape 27 where two pairs of the mark-in point and the mark-out point are designated similarly to the example shown in FIG. 29 is changed. In this figure, reference symbol RS represents a recording start point, RE represents a recording end point, MARK-IN1 represents a first mark-in point obtained before the change, MARK-OUT1 represents a first mark-out point, MARK-IN2 represents a second mark-in point, and MARK-OUT2 represents a second mark-out point. Each of a recording source between the first mark-in and mark-out points and a recording source between the second mark-in and mark-out points are added with the additional information such as the OK/NG, the take number and the scene number. Before the change of the mark-in point, the index picture information includes an index picture information includes an index picture 91 off the first mark-in point which is not changed and an index picture 92 at the second mark-in point.

When the first mark-in point is changed, the video tape 27 is reproduced and a user selects a new first mark-in point and presses the mark-in switch of the operation unit 33 while watching a reproduced picture. If a time at when the mark-in switch is pressed belongs to the same scene and take as those of the first mark-in point set before the change, the time code obtained when the mark-in switch is pressed is temporarily stored as the time code of the new first mark-in point (in step S102). IN FIG. 38, the new first mark-in point is represented by KARK-IN1N. If it is determined that the time code of the new first mark-in point MARK-IN1N is smaller than the time code of the first mark-out point MARK-OUT1 (step S106; Y), the new first mark-in point MARK-IN1N is registered (in step S107). Consequently, the data of the first mark-in point MARK-in 1 set before the change on the cassette attached memory 16 and the video tape 27 are replaced with the data of the new first mark-in point MARK-IN1N (in step S115).

FIG. 39 is a diagram showing change of the data in the cassette attached memory 16 presented when the first mark-in point is changed as described above. FIG. 39(*a*) is a diagram showing the data which have not been changed, and FIG. 39(*b*) is a diagram showing the changed data. As shown in the figure, in an option area in the cassette attached memory 16, the packs IP11(MARK-IN1), IP12(MARK-IN1) where the data of the previous first mark-in point MARK-IN1 are recorded are changed to the packs IP11 (MARK-IN1N), IP12(MARK-IN1N) where data of the new first mark-in point MARK-IN1N are recorded.

Figure 40A:
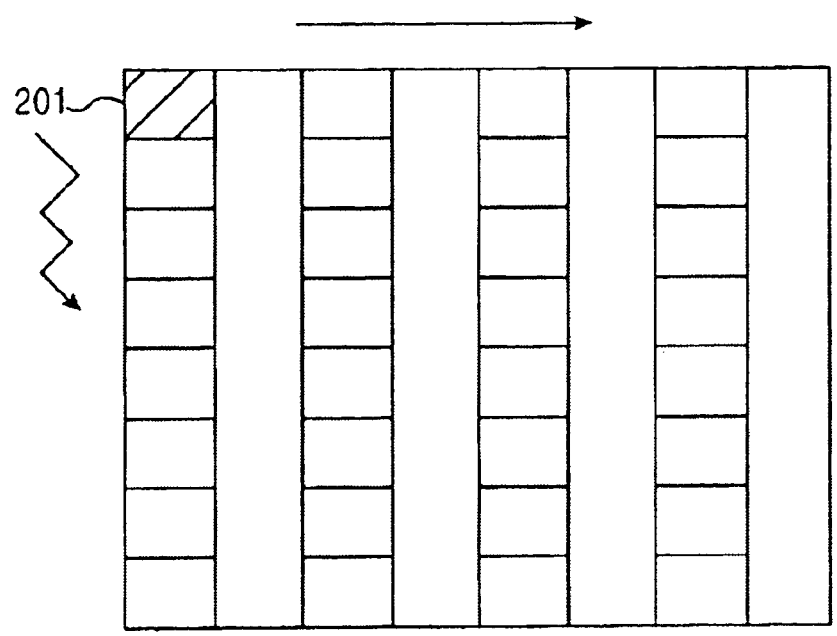
FIG. 40 is an explanatory diagram used to explain modification of the index picture information upon the change of the mark-in point shown in FIG. 38.
Figure 40B:
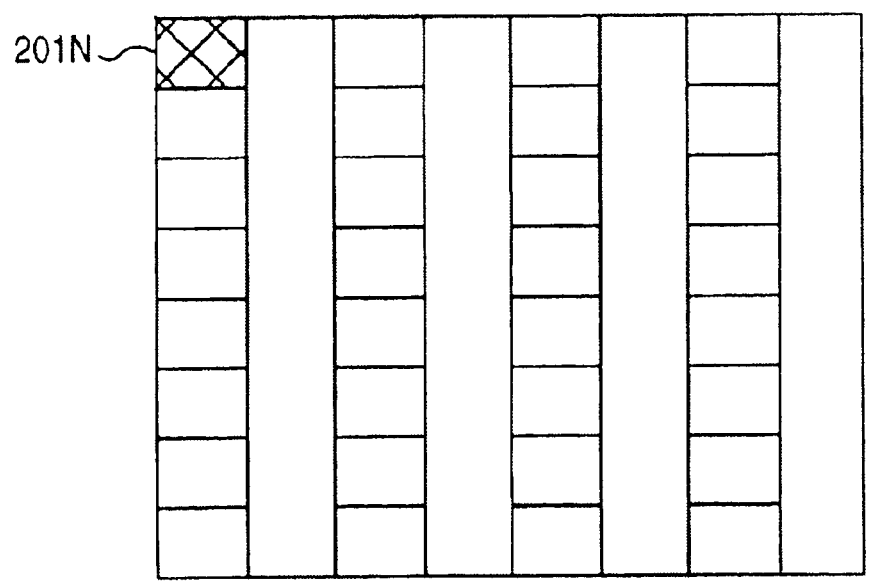

As shown in FIG. 38, when the new first mark-in point MARK-IN1N is registered, the index picture 91N thereof is supplied to the index generating unit 40 and consequently the index picture information is also modified. This modification of the index picture information will be described with reference to FIG. 40. FIG. 40(*a*) is a diagram showing a state of the index picture information in the index memory 41 before the first mark-in point is changed. In this figure, reference numeral 201 represents an index picture obtained after the previous first mark-in point is compressed and reduced. An arrow in this figure represents a recording order of the index pictures.

The index picture information is stored in the index memory 41 before the modifying processing is executed. In a method of the storage, the index picture information 93 recorded on the video tape 27 may be read and stored in the index memory 41, or each of index pictures may be fetched from the video tape 27 based on the index information recorded on the cassette attached memory 16 to generate the index picture information which is to be stored in the index memory 41.

When the new first mark-in point MARK-IN point MARK-IN1N is registered, as shown in FIG. 40(*a*), the index generating unit 40 replace the compressed and reduced index picture 201 of the previous first mark-in point MARK-IN1 with the compressed and reduced index picture 201N of the new first mark-in point MARK-IN1N.

Figure 41A:
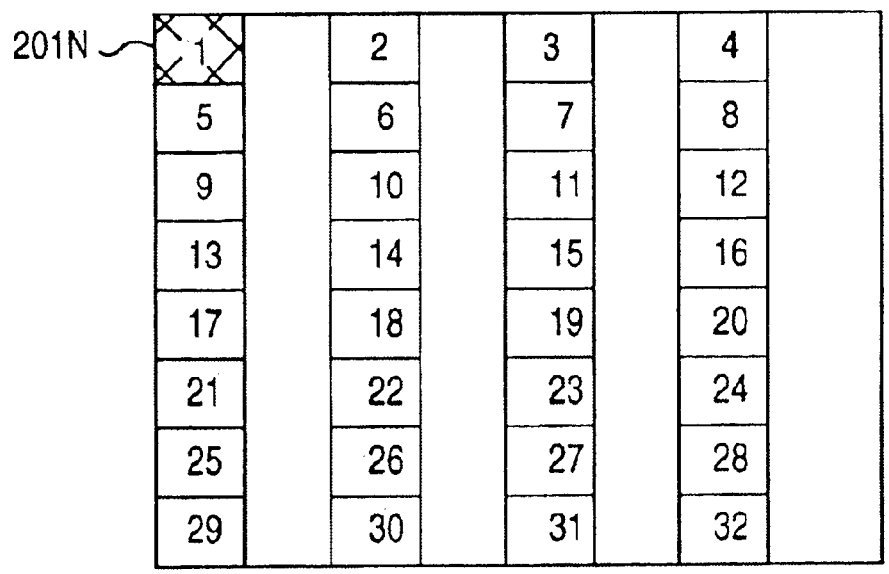
FIG. 41 is a diagram used to explain a relationship between the index picture information and the data in the cassette attached memory in the case shown in FIGS. 38 and 40.
Figure 41B:
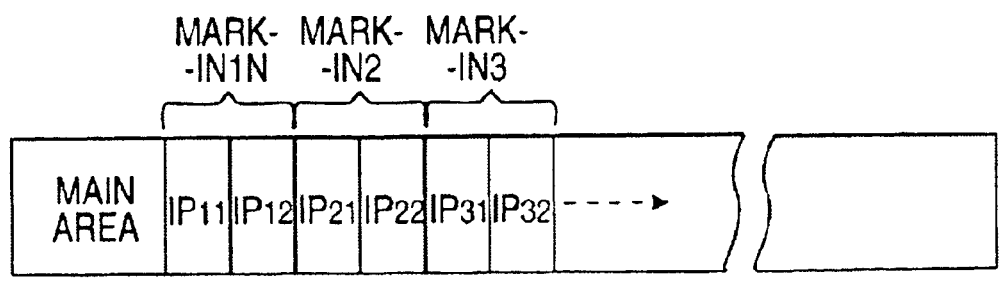

Correspondence between the index picture information and data in the cassette attached memory 16 in the example shown in FIG. 38 or FIG. 40 will be described with reference to FIG. 41. FIG. 41(*a*) is a diagram showing an index picture information, and FIG. 41(*b*) is a diagram showing data of the cassette attached memory 16. As shown in FIG. 41(*a*), in the index picture information, the compressed and reduced index pictures of the mark-in points MARK-IN1N, MARK-IN2, MARK-IN3, . . . are recorded in an order of numerals 1 to 32 in the figure. Then, paris of the packs IPn1 and IPn2 corresponding to each index picture are stored in the cassette attached memory 16 from a head address of a subarea in an order of the numerals in FIG. 41(*a*). therefore, the address of the cassette attached memory 16 where the pair of the packs IPn1 and IPn2 are recorded and the position of each index picture in the index picture information correspond to each other.

Figures 42, 43A, 43B:
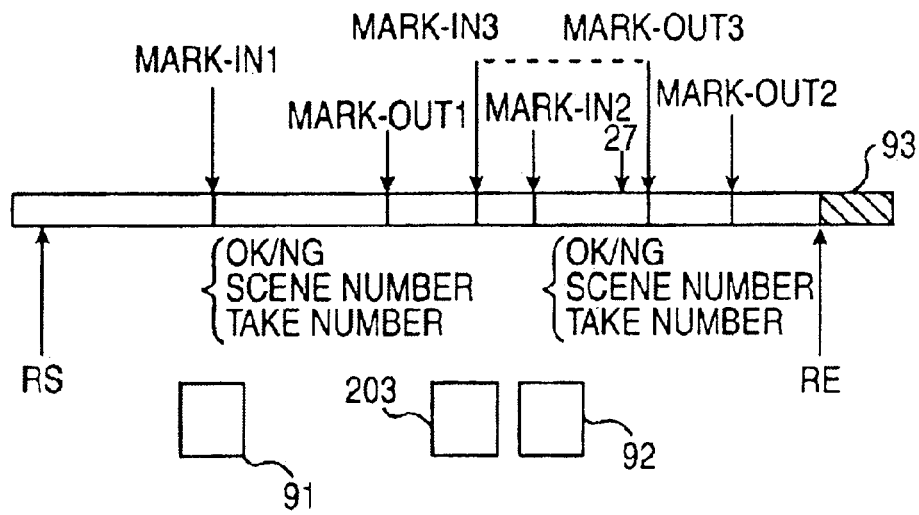
FIG. 42 is a diagram used to explain addition of the mark-in point and the mark-out point according to the embodiment of the present invention.

Addition of the mark-in point and the mark-out point will specifically be described with reference to FIG. 42. FIG. 42 is a diagram schematically showing a state of the video tape 27 presented when new mark-in and mark-out points are added to the video tape 27 where two pairs of mark-in and mark-out points are designated.

When the mark-in point and the mark-out point are added, the video tape 27 is reproduced. Then, a user select a new mark-in point MARK-IN3 and presses the mark-in switch of the operation unit 33 while watching a reproduced picture, and the user further selects a new mark-out point MARK-OUT3 and presses the mark-out switch of the operation unit 33. The mark-in point and the mark-out point belong to the same scene and take (in the example of FIG. 42, to the same scene and take of the second mark-in point MARK-IN2 and the mark-out point MARK-OUT2), and the mark-in point MARK-IN3 and the mark-out point MARK-OUT3 are registered and thus additionally registered in the cassette attached memory 16 and the video tape 27. In this example, the time code of the third mark-in point MARK-IN3 is smaller than the time code of the second mark-in point MARK-IN2.

FIG. 43 is a diagram showing change of the data in the cassette attached memory 16 obtained when the mark-in point MARK-IN3 and the mark-out point MARK-OUT3 are added as described above. FIG. 43(*a*) is a diagram showing the data state before change, and FIG. 43(*b*) is a diagram showing the data state after the change. As shown in these figures, in the option area in the cassette attached memory 16, the data of the second mark-in point MARK-IN2 and the succeeding points are recorded again areas whose addresses are added by two-pack amount, a pair of packs IP21 (MARK-IN3) and the IP22(MARK-IN3) of a new third mark-in point MARK-IN3 are inserted between a pair of packs IP11 (MARK-IN1) and IP12 (MARK-IN1) of the first mark-in point MARK-IN1 and a pair of packs IP31 (MARK-IN2) and IP32 (MARK-IN2) of the first mark-in point MARK-IN2.

Figure 44A:
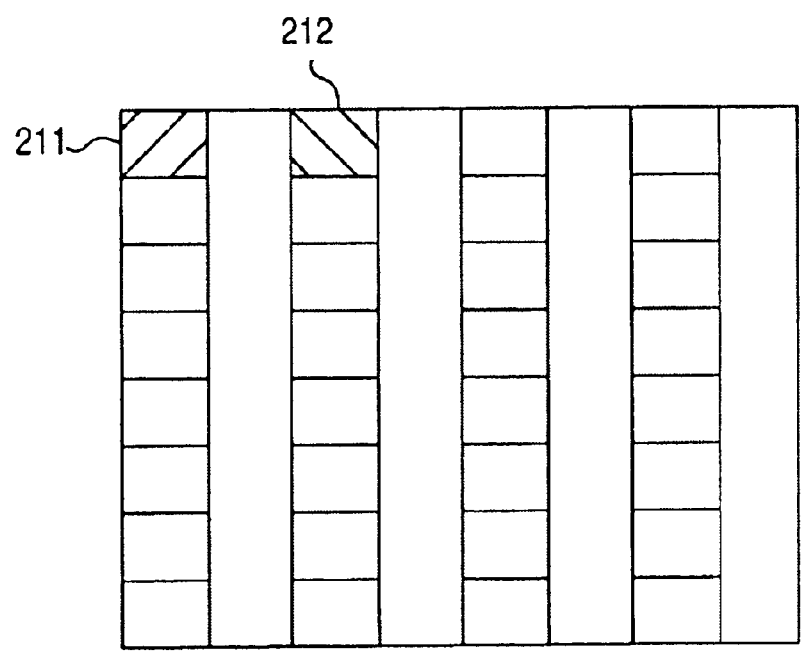
FIG. 44 is a diagram used to explain modification of index picture information upon the addition of the mark-in point and the mark-out point shown in FIG. 42.

As shown in FIG. 42, when the new third mark-in point MARK-IN2 is registered, an index picture 203 thereof is fetched into the index generating unit 40 and consequently the index picture information is also modified. Modification of the index picture information will be described with reference to FIG. 44. FIG. 44(a) is a diagram showing a state of the index picture information in the index memory 41 before the third mark-in point and the third mark-out point are added. IN this figure, reference numerals 211, 212 respectively represent compressed and reduced index pictures of the first mark-in point MARK-IN1 and the second mark-in point MARK-IN2.

Figure 44B:
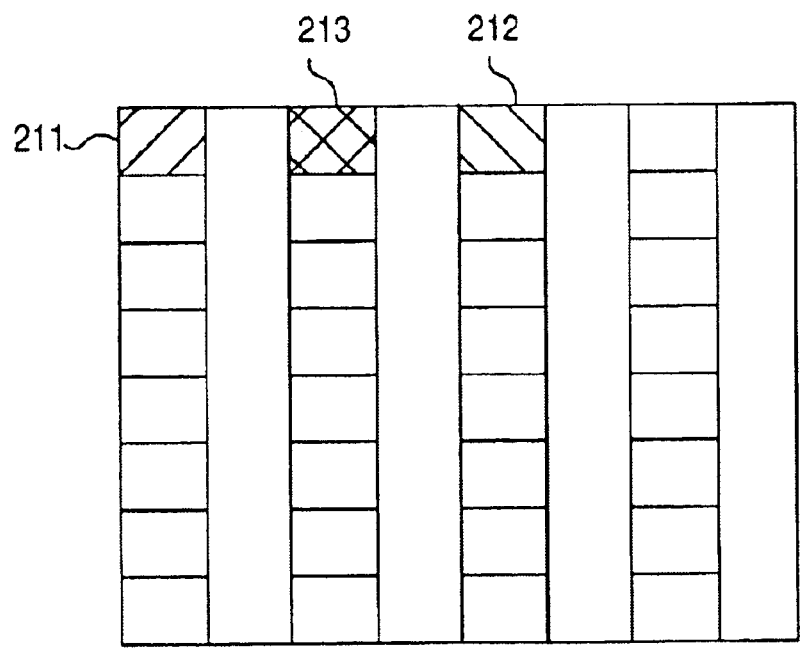

When the new third mark-in point MARK-IN3 is registered, as shown in FIG. 44(b), the index generating unit 40 rearranges the compressed and reduced index picture 212 and the succeeding compressed and reduced index pictures by moving them backward one by one in the order of registration and locates a compressed and reduced index picture 213 of the new third mark-in point MARK-IN3 between the compressed and reduced index picture 211 of the first mark-in point MARK-IN1 and the compressed and reduced index picture 212 of the second mark-in point MARK-IN2.

IN the index memory 41, the position of each of the index pictures in the index picture information and the address thereof in the index memory 41 correspond to each other. Therefore, the above-mentioned rearrangement of the index pictures can easily be carried out by changing a storage position (address) of each index picture in the index memory 41.

Figure 45A:
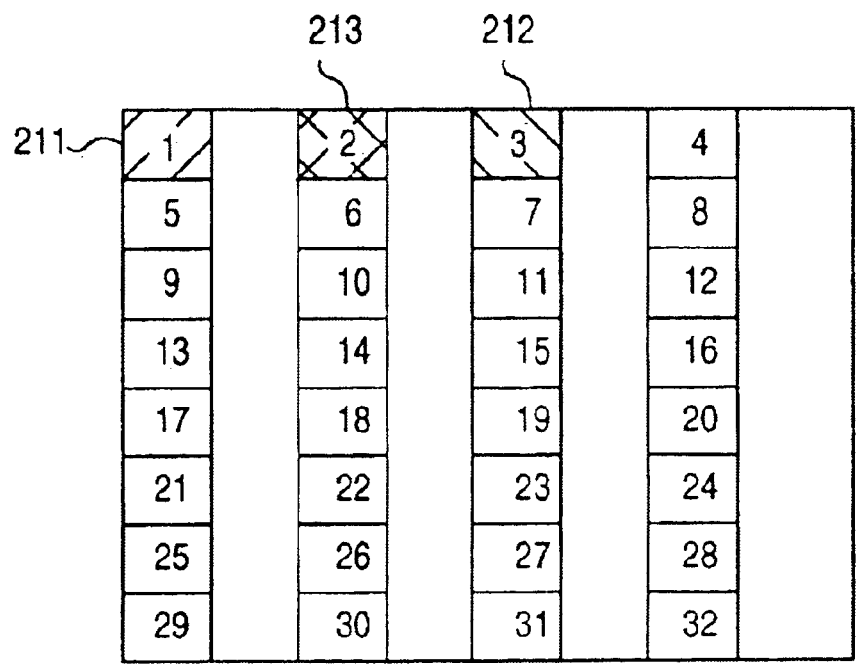
FIG. 45 is a diagram used to explain a relationship between the index picture information and the data in the cassette attached memory in the case shown in FIGS. 42 and 44.
Figure 45B:
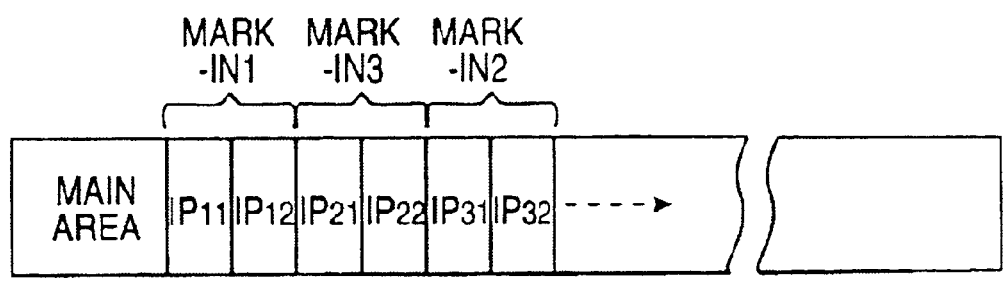

Correspondence between the index picture informations and the data in the cassette attached memory 16 in the example shown in FIG. 42 or 44 will be described with reference to FIG. 45. A method of writing the modified index picture information includes a method of recording the modified index picture information on the video tape 27 independently of the index picture information already recorded on the video tape 27 and a method of overwriting the modified index picture information on a portion of the video tape 27 where the index picture information is already recorded.

Figures 46, 47A, 47B:
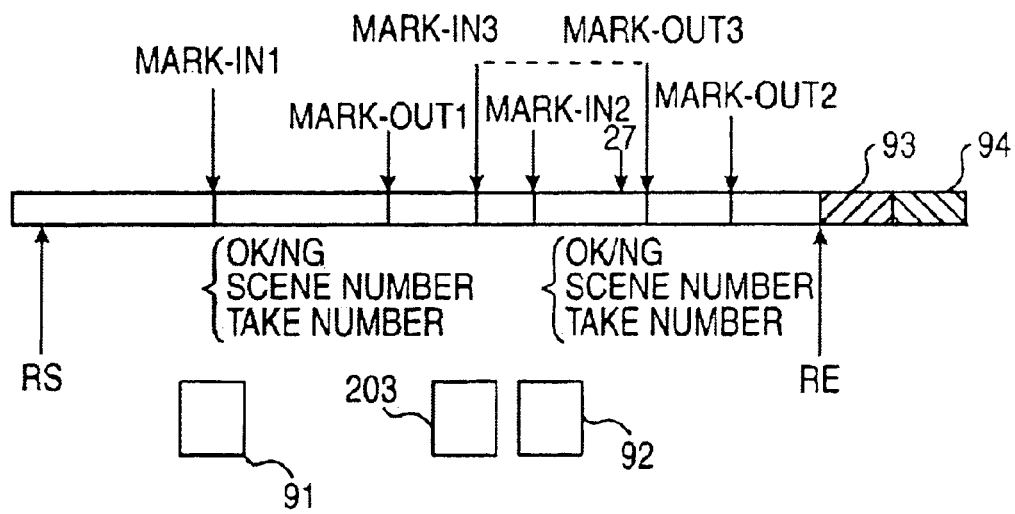
FIG. 46 is a diagram used to explain a method of recording a modified index picture information independently of a previously recorded index picture information according to the embodiment of the present invention.

The method of recording the modified index picture information on the video tape 27 independently of the index picture information already recorded on the video tape 27 will be described with reference too FIG. 46. FIG. 46 is a diagram schematically showing a state of the video tape 27 when the new third mark-in point and the new third mark-out point are added to the video tape 27 where two pairs of mark-in and mark-out points are designated as described with reference to FIG. 42. In this example, the index picture information 93 which has not been modified is recorded at a position immediately succeeding a recording end point RE on the video tape 27, and the modified index picture information 93 is recorded at the succeeding position thereof. In this case, since the index picture information 93 which has not been modified and the modified index picture information 94 are recorded on the video tape 27, it is possible for a user to confirm the difference between the index pictures set before and after the modification.

The method of recording the modified index picture information 93 on the video tape 27 independently of the index picture information 93 which has not been modified will be described with reference too FIG. 47. FIG. 47(a) is a diagram showing a state of the cassette attached memory 16 before the modification, and FIG. 47(b) is a diagram showing a state of the cassette attached memory 16 after the modification. As shown in these figures, the packs IPadd1, IPadd2 indicating the recording position of the unmodified index picture information 92 on the video tape 27 are set void. Specifically, the IP bit of the pack IPadd2 shown in FIG. 19 is set to "0" (void). Then, packs IPadd1, IPadd2N indicating the recording positions of the modified index picture information 94 on the video tape 27 are recorded in the cassette attached memory 16. In the pack IPadd2 shown in FIG. 47(a) and the pack IPadd2N shown in FIG. 47(b), the IP bits are set to "1" (valid).

In the example shown in FIG. 47, since the packs IPn1, IPn2 stored in the cassette attached memory 16 correspond to the modified index picture information 94 and does not correspond to the unmodified index picture information 93, it is impossible to obtain information such as time code corresponding to each index picture included in the unmodified index picture information 93. However, if the cassette attached memory 16 has a large storage capacity, the packs IPn1 and IPn2 corresponding to the unmodified index picture information 93 are kept in the cassette attached memory 16 as they are, thereby making it possible to obtain information such as time codes corresponding to respective index pictures included in the unmodified index picture information 93.

Figures 48, 49A, 49B:
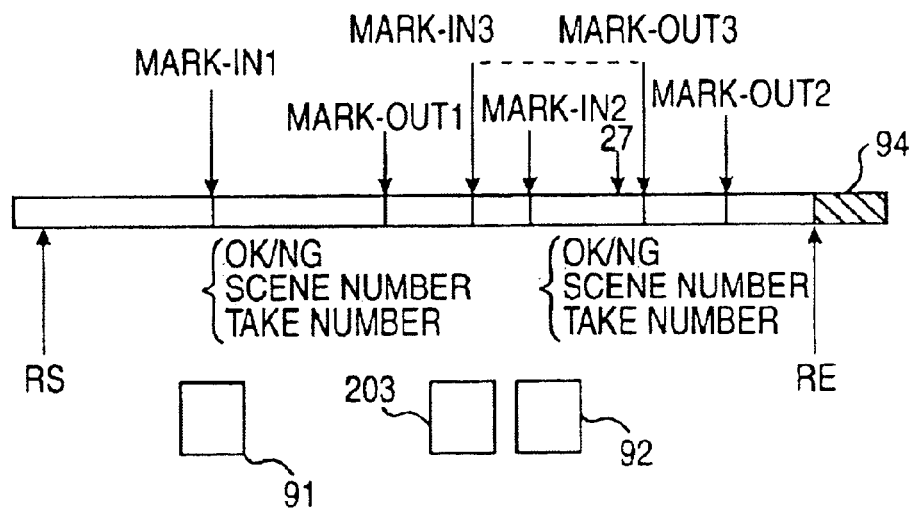
FIG. 48 is a diagram used explain a method of overwriting the modified index picture information on a portion of the video tape where the index picture information is already recorded according to the embodiment of the present invention.

A method of overwriting the modified index picture information on a portion of the video tape 27 where the unmodified index picture information 93 is recorded will be described with reference to FIGS. 48 and 49. FIG. 48 is a diagram showing a state in which on the video tape 27 where the unmodified index picture information 93 is recorded at the position succeeding the recording end point RE similarly to the example of FIG. 46, the modified index picture information 94 is overwritten on the portion where the unmodified index picture information 93 is already recorded.

FIG. 49(a) is a diagram showing a state of the cassette attached memory 16 before the modification, and FIG. 49(b) is a diagram showing a state of the cassette attached memory 16 after the modification. A shown in these figures, when the modified index picture information 94 is overwritten, the packs IPadd1 and IPadd2 indicating the recording position of the unmodified index picture information 93 on the video tape 27 are replaced with the packs IPadd1N and IPadd2N of the modified index picture information 94 on the video tape 27.

Subsequently, a method of, to modify the index picture information, storing the unmodified index picture information in the index memory 41 before the modifying processing is executed will be described with reference to FIGS. 50 and 51. As described above, the method of storing the unmodified index picture information in the index memory 41 includes the method of reading the index picture information recorded on the video tape 27 to store it in the index memory 41 and the method of fetching the respective index pictures from the vide tape 27 to generate the index picture information which is to be stored in the index memory 41.

Figure 50:
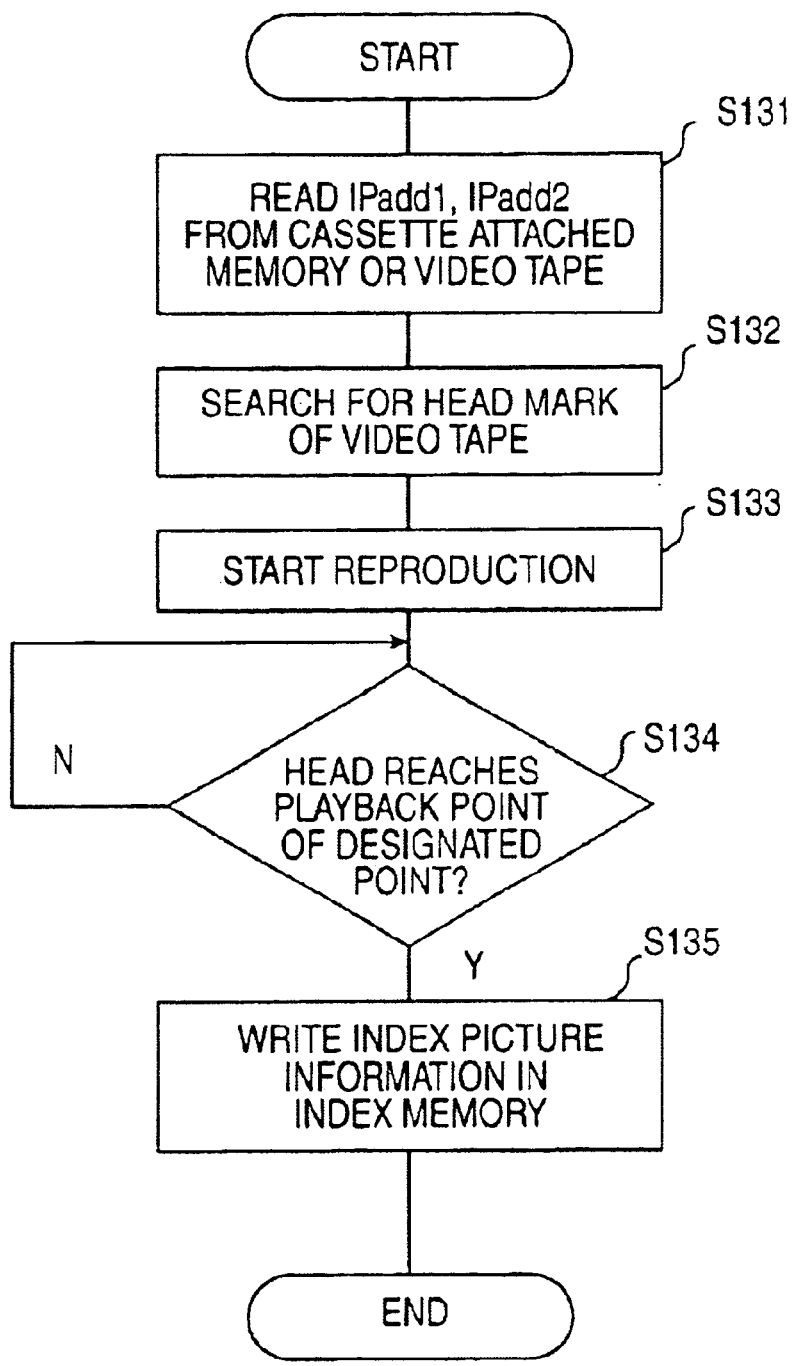
FIG. 50 is a flowchart showing an operation of reading the index picture information recorded on the video tape to store it in the index memory according to the embodiment of the present invention.

FIG. 50 is a flowchart used to explain an operation of for reading the index picture information recorded on the video tape 27 to store it in the index memory 41. This operation is carried out by the digital vide cassette recorder 13 shown in FIG. 3 and is carried out initially when the user issues a command to carry out the modifying processing shown in FIGS. 36 and 37 with the operation unit 33. IN the operation shown in FIG. 50, the controller 35 read the packs IPadd1 and IPadd2 indicating the recording position of the index picture information on the video tape 27 (in step S131). The controller 35 carries out an operation for searching for a head position of the recording position of the index picture information on the video tape 27 (setting a playback start position) (in step S132). Specifically, the controller 35 sets a playback start position to a pre-roll point located by a predetermined time (e.g., five seconds) ahead of the recording position of the index picture information. The controller 35 starts reproducing the video tape 27 (in step S133). The controller 35 is brought in its standby state until a reproduction head reaches a playback point of a designated point of the video tape 27, i.e., the recording position of the index picture information (in step S134). If the head reaches the recording position of the index picture information, the controller writes the reproduced index picture information in the index memory 41 (in step S135), and then the processing is ended.

As described with reference to FIG. 41 and so on, in the cassette attached memory 16, a pair of packs IPn1 and IPn2 of each of the index pictures in the index picture information is stored in the recording order of the index pictures. Each of the index pictures in the index picture information and the pair of the packs IPn1 and IPn2 in the index picture information correspond to each other.

Although the operation shown in FIG. 50 enjoys the advantage that the index picture information can be stored in the index memory 41 quickly (with shorter time), the picture quality becomes deteriorated because the index picture information is used for the modifying processing and the modified index picture information is compressed again and then recorded on the video tape 27.

Figure 51:
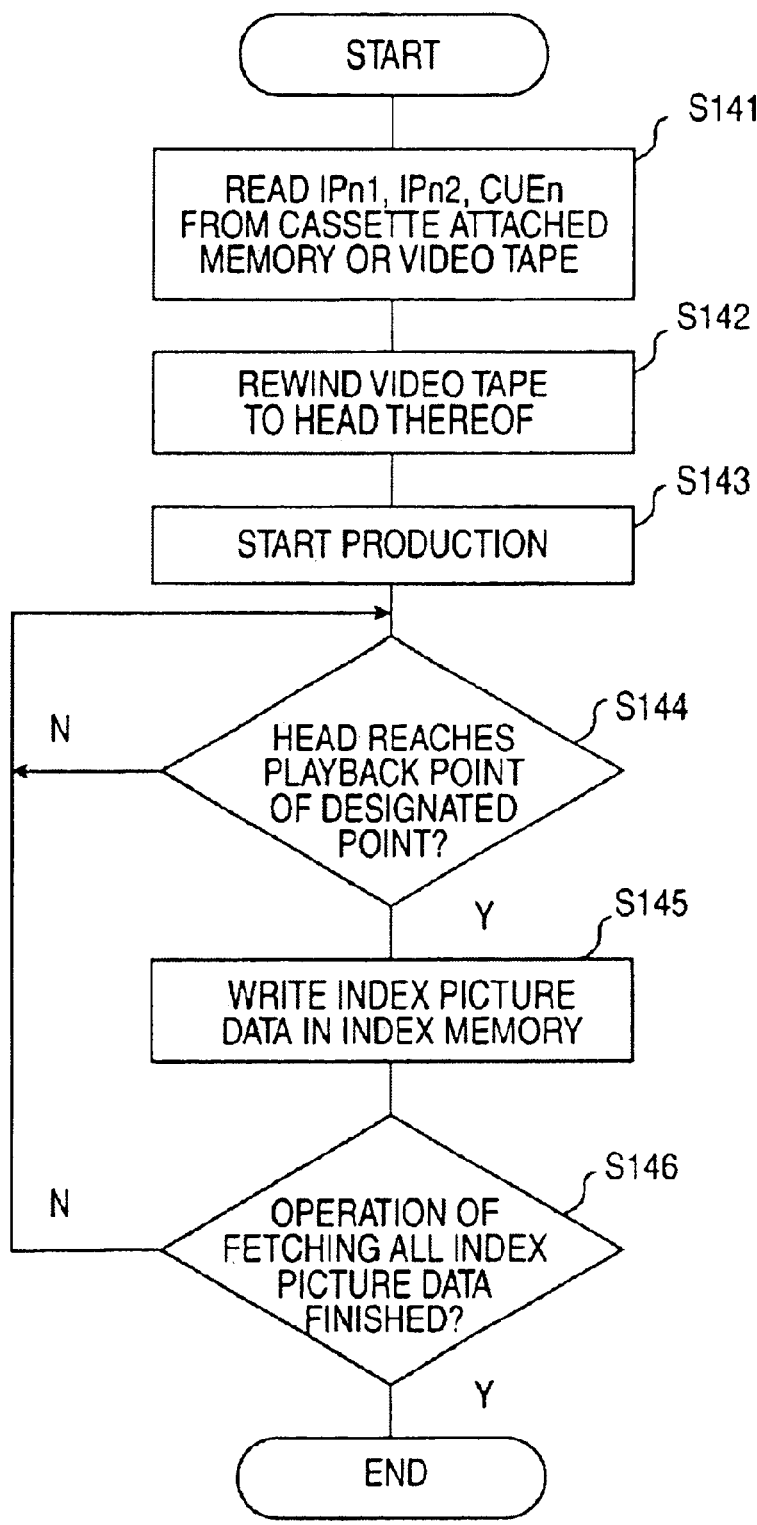
FIG. 51 is a flowchart showing an operation of fetching the respective index pictures from the video tape based on the index information recorded in the cassette attached memory to generate the index picture information according to the embodiment of the present invention.

FIG. 51 is a flowchart used to explain an operation for fetching each index picture from the video tape 27 based on the index information recorded in the cassette attached memory 16 to generate the index picture information which is to be stored in the index memory 41. This operation is carried out by the digital video cassette recorder 13 shown in FIG. 3 and initially carried out when a user issues a command to carry out the modifying processing shown in FIGS. 36 and 37. In the operation shown in FIG. 51, the controller 35 reads all the packs IPn1, IPn2, CUEn from the cassette attached memory 16 or the video tape 27 (in step S141). The controller 35 controls an operation for rewinding the video tape 27 to its head (in step S142). The controller 35 issues a command to start reproduction of the video tape 27 (in step S143). The controller 35 is brought in its standby state until a playback head reaches a playback point of the designated point, i.e., a recording position of an index picture based on each of the index informations (in step S144). When the head reaches the recording position of the index picture, the video data of the reproduced index picture is written in the index memory 41 (in step S145). The controller 35 determines whether or not the operation for fetching the video data of all the index picture has been finished (in step S146). If it is determined that the operation has not been finished (as represented by N), the processing returns to step S144, wherein the video data of the next index picture is fetched. If the controller 35 determines that the operation for fetching the video data of all the index pictures has been finished (in step S146; Y), then the operation is ended. The video data of each of the fetched index pictures are compressed and reduced by the index generating unit 40 and the video signal compression coding and decoding unit 23 and stored in a predetermined storage position (address) in the index memory 41, thereafter the index picture information being generated.

As to the index picture information generated by the operation shown in FIG. 41 and stored in the index memory 41, each of the index pictures in the index picture information and the pair of packs IPn1 and IPn2 in the cassette attached memory 16 correspond to each other.

In the operation shown in FIG. 41, although the operation for storing the index picture information in the index memory 41 is carried out slowly (with long period of time), this operation can enjoy the advantage that even if the index picture information is modified and then recorded on the video tape 27, the picture quality is prevented from being deteriorated as compared with the unmodified index picture information.

As described above, according to the index picture generating method and apparatus of this embodiment, even if the index picture information is not generated upon the shooting, it is possible to generate the index video information based on the index information (information about the mark-in point, the mark-out point and the cue point) and the additional information (i.e., information such as the OK/NG, the take number, the scene number) to then record it on the video tape 27. Therefore, even if the shooting is carried out with an equipment having no function to generate the index picture information, the index picture information is late generated and recorded on the video tape 27, thereby making it possible to efficiently carry out the editing work using the index picture information (i.e., improving an operation for searching for a desired head position on the video tape 27 or introducing outlines of the video information recorded on the video tape 27).

Moreover, according to the index picture generating method and apparatus of this embodiment, it is possible to generate the index picture by selecting a picture matched with a desired condition based on the index information and the additional information and to employ a picture which the user desires as the index picture since the index picture is generated optionally or by designation. Therefore, it is possible to more efficiently carry out the editing work.

According to this embodiment, since the index information, the additional information and the index picture information recorded on the video tape 27 and in the cassette attached memory 16 can be modified later, it is possible to carry out rough editing processing before the main editing work, which leads to more efficient editing work.

According to the index picture generating method and apparatus of this embodiment, since the index information and the additional information are recorded on both the cassette attached memory 16 and the video tape 27, even if the shooting is carried out with the digital video cassette 12 having not cassette attached memory 16, then it is possible to generate the index picture information later and record it on the video tape 27.

This embodiment can be applied to an equipment which does not have a function to generate and modify the index picture information (see steps S116 to S120 of FIG. 37). In this case, it is possible to modify only the index information and the additional information without modifying the index picture information.

The present invention is not limited to the above embodiment. While in the embodiment the index information and the additional information are recorded on both the cassette attached memory 16 and the video tape 27, they may be recorded on either of them. While in this embodiment the time code of the recording position on the video tape 27 of the index picture information is recorded on both the cassette attached memory 16 and the video tape 27, it may be recorded on either of them.

While in this embodiment the index information and the additional information recorded on the cassette attached memory 16 are used when the index picture information is generated, the index information and the additional information recorded on the video tape 27 may be used.

THe digital VTR unit in the camera/recorder 11 may have the arrangement shown in FIG. 3 to generate and record the index picture information.

While in this embodiment a user designates the cue point with the operation unit 33, the cue point may be designated based on a trigger signal from the outside. The trigger signal from the outside may be a signal obtained by detecting a sound of a pistol used for a sport event or an output signal from a sensor for detecting start or goal when a user shoots a scent in a sport event, or a signal output from a sensor for detecting that a jet coaster passes through a predetermined position when a user shoots a scene upon a jet coaster's passing by the predetermined position. When the present invention is applied to a monitoring apparatus (e.g., an a camera for monitoring waves), the trigger signal from the outside may be a trigger signal generated at a predetermined time (e.g., at high tide).

As described above, according to the index picture generating method of the present invention and the index picture generating apparatus of the present invention, since the index picture is selected based on at least the index information of the index information and the additional information recorded on at least one of the recording medium and the memory accompanying the recording medium and the index picture information used for easily displaying this index information is generated and recorded on the recording medium, even if the index picture information is not generated upon the filming, it is possible to generate the index picture information based on at least the index information of the index information and the additional information recorded on at least one of the recording medium where the video information is recorded and the memory attached to this recording medium, and it is possible to select the picture matched with a desired condition from the video information recorded on the recording medium to generate the index picture information.

According to the apparatus of the present invention, since at least one of the index information and the additional information is modified and then recorded on at least one of the recording medium and the memory, at least one of the index information and the additional information can be modified latter, which leads to more efficient editing work.

What is claimed is:

1. A method of recording and indexing video data on a digital cassette having a tape medium and an attached memory, comprising the steps of:

generating an index information corresponding to a point on the tape medium where a designated portion of the video data is recorded using a user controlled switch; the index information for use as an index when editing the video data;

generating an additional index information corresponding to said index information for specifying an attribute of the designated portion of the video data;

selecting a video frame from the designated portion of the video data on the basis of the index information and the additional index information;

generating an index picture information from the selected video frame for displaying the selected video frame corresponding to said index information when editing the video data;

recording the index information and the additional index information in the attached memory of said digital cassette; wherein the additional index information recorded in the attached memory includes information of an automatically increased scene number;

recording the index information and the additional index information in sub-code sections of corresponding recorded tracks throughout the tape medium; each recorded track on the tape medium having a sub-code section; and recording the index picture information on the tape medium.

2. The method according to claim 1, wherein the point corresponding to said index information is a mark-in point, mark-out point, or cue point in the video data.

3. The method according to claim 1, wherein the attribute is a take number, a scene number, or a good/no good indicator for the designated portion of the video data.

4. A recording apparatus for recording and indexing video data on a digital cassette having a tape medium and an attached memory, comprising:

an operational unit for generating an index information corresponding to a point on the tape medium where a designated portion of the video data is recorded; the index information for use as an index when editing the video data; the operational unit having a user controlled switch for use in generating the index information;

said operational unit further generating an additional index information corresponding to said index information for specifying an attribute of the designated portion of the video data;

an index generating unit for selecting a video frame from the designated portion of the video data on the basis of the index information and the additional index information, and for generating an index picture information from the selected video frame for displaying the selected video frame corresponding to said index information when editing the video data; and recording means for recording the index information and the additional index information in the attached memory of said digital cassette and in sub-code sections of corresponding recorded tracks throughout the tape medium; wherein the additional index information recorded in the attached memory includes information of an automatically increased scene number; each recorded track on the tape medium having a sub-code section; and recording the index picture information on the tape medium.

5. The recording apparatus according to claim 4, wherein the point corresponding to said index information is a mark-in point, mark-out point, or cue point in the video data.

6. The recording apparatus according to claim 4, wherein the attribute is a take number, a scene number, or a good/no good indicator for the designated portion of the video data.

7. A digital cassette for recording and indexing video data, comprising:

an attached memory for storing index information corresponding to a point on a tape medium where a designated portion of the video data is recorded and additional index information onto the tape medium; the index information for use as an index when editing the video data; the index information being generated with a user controlled switch; the additional index information stored in the attached memory includina information of an automatically increased scene number; and said tape medium storing the index information and the additional index information in sub-code sections of corresponding recorded tracks throughout the tape medium; each recorded track on the tape medium having a sub-code section; the additional index information specifying an attribute of the designated portion of the video data corresponding to said index information;

said tape medium further storing index picture information corresponding to a video frame from the designated portion of the video data; the index picture information for displaying the video frame corresponding to said index information when editing the video data.

8. The digital cassette according to claim 7, wherein the point corresponding to said index information is a mark-in point, mark-out point, or cue point in the video data.

9. The digital cassette according to claim 7, wherein the attribute is a take number, a scene number, or a good/no good indicator for the designated portion of the video data.

* * * * *